United States Patent [19]

Imai

[11] Patent Number: 5,137,347
[45] Date of Patent: Aug. 11, 1992

[54] INFORMATION RETRIEVAL APPARATUS

[75] Inventor: Ryoichi Imai, Tokyo, Japan

[73] Assignee: Canon Kabushiki Kaisha, Tokyo, Japan

[21] Appl. No.: 703,697

[22] Filed: May 21, 1991

Related U.S. Application Data

[63] Continuation of Ser. No. 309,362, Feb. 13, 1989, abandoned.

[30] Foreign Application Priority Data

Feb. 16, 1988 [JP] Japan .................. 63-031940
Nov. 4, 1988 [JP] Japan .................. 63-278756

[51] Int. Cl.$^5$ ............................. G03B 23/12
[52] U.S. Cl. ..................... 353/26 A; 353/27 A; 377/18; 250/570; 250/557
[58] Field of Search .............. 353/25, 26 R, 26 A, 353/27 R, 27 A, 40, 41; 377/17, 18; 250/570, 557, 561

[56] References Cited

U.S. PATENT DOCUMENTS

| | | | |
|---|---|---|---|
| 3,744,890 | 7/1973 | Suzuki et al. | 353/26 A |
| 3,820,884 | 6/1974 | Sone et al. | 353/26 A |
| 3,870,410 | 3/1975 | Abe | 353/26 A |
| 3,872,453 | 3/1975 | Tsukamoto et al. | 353/26 A |
| 3,958,885 | 5/1976 | Stockinger et al. | 356/139 |
| 4,032,230 | 6/1977 | Shipman et al. | 353/26 A |
| 4,219,737 | 8/1980 | Gagnon et al. | 250/570 |
| 4,570,075 | 2/1986 | Spiero | 250/570 |

FOREIGN PATENT DOCUMENTS 58-43444 3/1983 Japan .
61-231666 10/1986 Japan .

OTHER PUBLICATIONS

IBM Technical Disclosure Bulletin, Keller et al., *Sensing Device for Holes in Travelling Tape*, vol. 18, No. 1, Jun. 1975.

*Primary Examiner*—William A. Cuchlinski, Jr.
*Assistant Examiner*—C. W. Fulton
*Attorney, Agent, or Firm*—Fitzpatrick, Cella, Harper & Scinto

[57] ABSTRACT

An information retrieval apparatus used in a microfilm reader, a reader/printer, or the like includes a first illuminator for illuminating information and a mark recorded on an information recording medium, a second illuminator for illuminating the mark, and a detector for detecting the mark illuminated by the second illuminator. The second illuminator includes a solid-state light-emitting element for emitting monochromatic radiation having a wavelength of visible light. A designator designates an optimal position of the detector on the basis of a position of the mark projected on a screen is arranged.

19 Claims, 19 Drawing Sheets

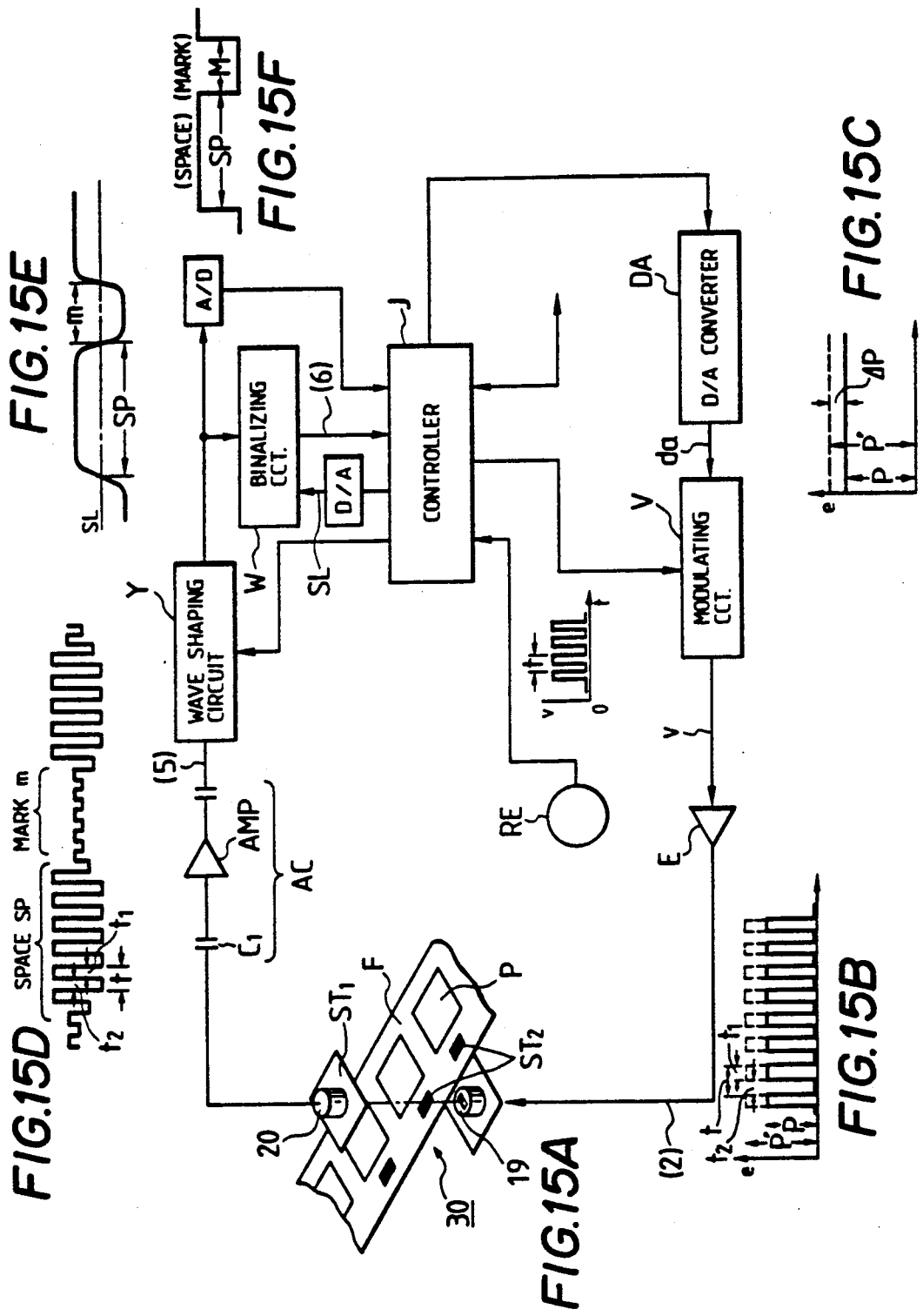

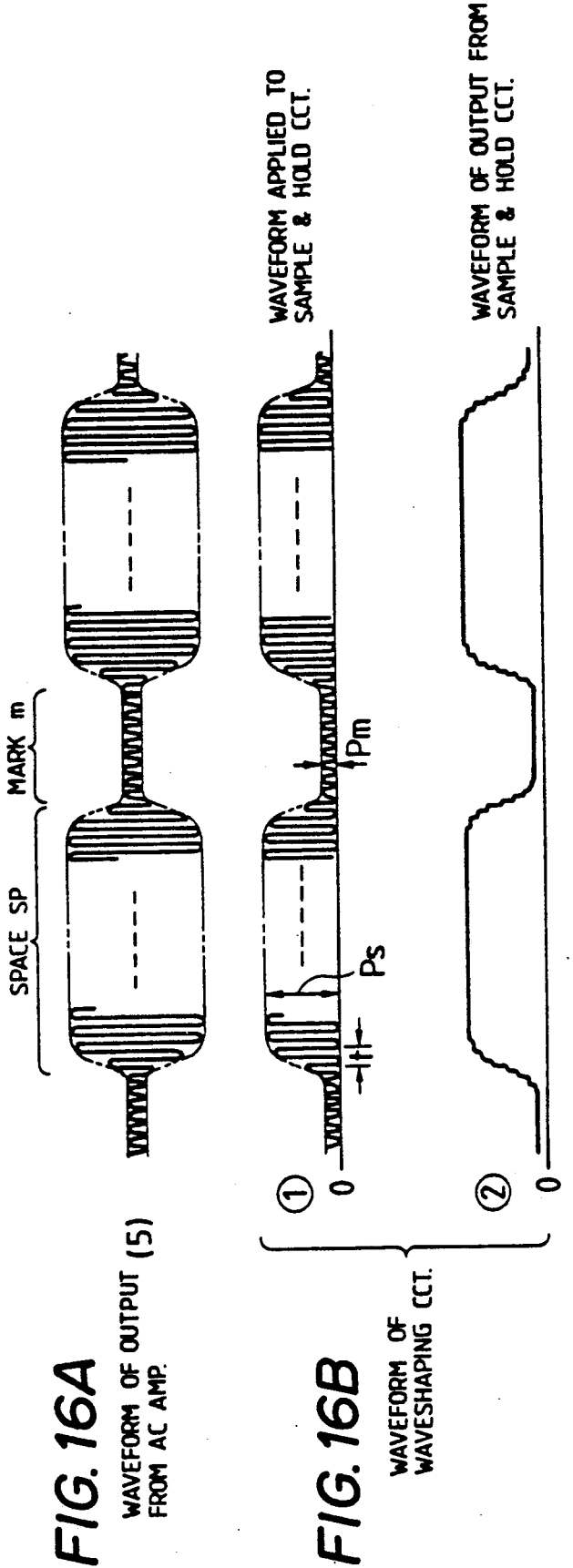

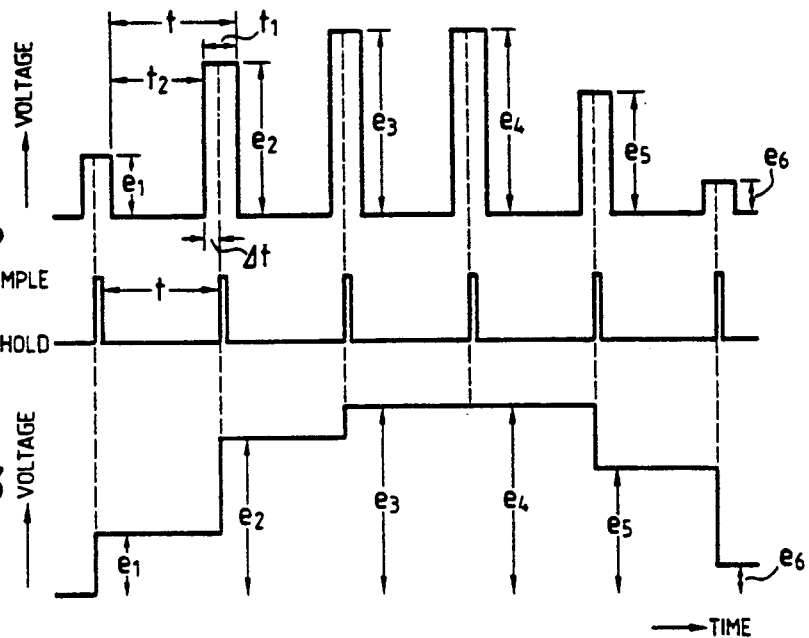
FIG.18A-1 INPUT WAVEFORM
FIG.18A-2 SAMPLE & HOLD PULSE SIGNAL SHP
FIG.18A-3 OUTPUT WAVEFORM
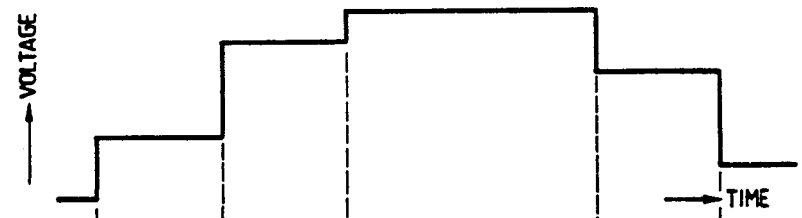
FIG.18B-1 WAVEFORM OF OUTPUT FROM SAMPLE & HOLD CCT.
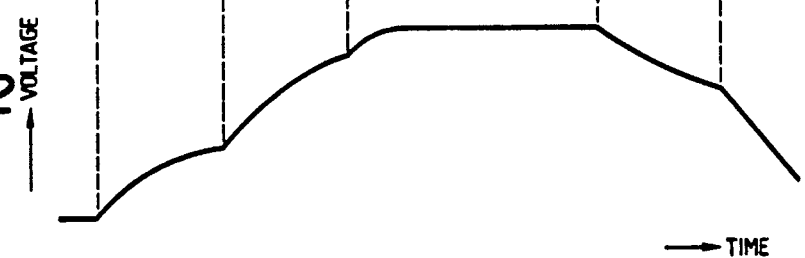
FIG.18B-2 WAVEFORM OF SIGNAL THROUGH FILTER CCT.

INFORMATION RETRIEVAL APPARATUS

This application is a continuation of application Ser. No. 309,362 filed Feb. 13, 1989, now abandoned.

BACKGROUND OF THE INVENTION

1. Field of the Invention

The present invention relates to an information retrieval apparatus incorporated in a microfilm reader, a reader/printer, or the like and, more particularly, to an information retrieval apparatus for detecting a mark recorded on an information recording medium such as microfilm and retrieving desired information.

2. Related Background Art

In a conventional retrieval apparatus incorporated in a microfilm reader or the like, a microfilm having marks respectively at the sides of image frames is used, and each mark is photoelectrically detected. The detected marks are counted to automatically retrieve a desired frame of the microfilm.

As shown in FIGS. 23 and 24, a mark m on a microfilm F is illuminated with a lamp 100, and a change in light which is shielded by the mark m is detected by a mark detector 101. An output signal from the mark detector 101 is counted by a counter in a controller 102. A count of the counter is compared by a comparator with a frame number of a desired image which is input from a console 103 such as a keyboard. If the count coincides with the input frame number, a stop signal is output from the comparator to a motor drive control circuit 104 to stop a motor M1 serving as a drive system for feeding the microfilm F. The desired frame is stopped at a predetermined position on a screen 105 through a projection lens 106.

As shown in FIGS. 10A, 10B, 10C and 10D, marks m are often recorded at different positions by different projectors. In a conventional information retrieval apparatus, the mark detector 101 is moved in accordance with positional differences in marks m so that a microfilm stop position is set to be an optimal position. FIG. 25 shows a structure of the mark detector 101. Light from the lamp 100 is received from a distal end 110a of an optical fiber 110 through a condenser lens 107 and a microfilm F and is guided to a photosensor 111. The mark detector 101 as a unit can be moved and adjusted in a direction of an arrow x along a guide groove 112 upon rotation of a screw shaft 113. The mark detector 101 can be adjusted to be located immediately above the mark m on the microfilm F.

At this time, since the mark detector 101 is located near an optical axis l of an optical system, as shown in FIGS. 23 and 24, the detector 101 is projected as a shadow S' on the screen 105. The position of the mark m recorded on the microfilm F is projected on the screen 105, and an operator turns an adjusting knob 114 such that the mark detector 101 is located at an optimal position while observing the screen 105. Therefore, the detector 101 can be set at the optimal position.

In the conventional apparatus, however, since the mark detector 101 is located near the optical axis l of an illumination optical system, its shadow S' is projected on the screen 105 and may conceal the image during a read operation of a frame 120 or interferes with an operator's field of view.

In the conventional apparatus, the lamp 100 for illuminating an image recorded in the frame 120 onto the screen 105 is also used as a light source for detecting the mark m. When the operator optimally adjusts the brightness of the screen illumination at the time of projection of the image on the screen 105, the amount of light incident on the mark detection photosensor 111 is also changed. An optimal light amount level for the photosensor 111 is not necessarily obtained. It is therefore difficult to stably operate the apparatus.

Furthermore, shading and a nonuniform light distribution are present in an actual illumination optical system. When the illumination optical system is used as a light source for detecting a mark as in the conventional case. The output from the mark detector 101 becomes unstable due to shading and the nonuniform light distribution. Shading is defined such that the quantity of light is generally increased when an object comes closer to the optical axis. Shading occurs due to various causes such as the state of a lamp filament, optical axis misalignment, dust, and contamination.

In the conventional technique described above, a light bulb such as a halogen lamp is used as the lamp 100 for illuminating the image and the mark, and therefore the following problems are presented.

(1) Since light from the lamp 100 has an emission wavelength range from a near infrared range of 700 nm or more to an infrared range, light is transmitted even through a mark (i.e., a nontransparent portion) of the microfilm, and a contrast level becomes low. As a result, the mark cannot be accurately or properly detected.

(2) In order to solve the above problem, an optical filter must be used in a conventional arrangement, and the entire mechanism becomes bulky and complicated, resulting in a high cost. In addition, it is difficult to perfectly eliminate the above-mentioned wavelength components.

(3) Since substantial heat is generated by a light bulb such as a halogen lamp, the temperature of the photosensor for detecting this light is increased accordingly. The characteristics of the photosensor as a semiconductor sensor are adversely affected to cause an operational failure of the sensor.

(4) Since the light bulb is used, the service life of the apparatus is short, and a serviceman must frequently replace the light bulb with a new one. For this purpose, the apparatus must be designed so that the light bulb can be easily replaced.

(5) The characteristics of the light bulb are subjected to deterioration over time, and the amount of light emitted is undesirably changed during use.

(6) When the quantity of light emitted is automatically adjusted, a CPU (microcomputer) or the like must be used. When a variable current is used, a time lag (long response time) between the change in current and a change in the temperature of the filament of the light bulb occurs to undesirably prolong the automatic light amount setting operation. For example, when the quantity of light is detected by the photosensor and is controlled to be a predetermined value, it takes about 5 to 6 seconds (a long response time in light amount adjustment).

(7) When a light bulb such as a halogen lamp is used, the drive power is increased and a large light source power circuit is required. The space for mounting this circuit is also increased, and the apparatus as a whole becomes bulky. In addition, a large-capacity drive transistor must be used, and its heat dissipation must be taken into consideration. As a result, the apparatus becomes complicated and the frequency of operational failure is increased, thus resulting in a high cost.

(8) When a blue diazo microfilm is used, light is transmitted at about a wavelength of 350 to 550 nm, and the contrast level is undesirably lowered.

SUMMARY OF THE INVENTION

The present invention has been made to solve the conventional problems described above, and has as its object to provide an information retrieval apparatus wherein a single-wavelength light source free from an infrared component is used as a light source for a mark detector to improve the reliability of mark detection, and a compact mark detecting means which has a long service life and is easy to maintain is provided.

It is another object of the present invention to provide an information retrieval apparatus capable of performing accurate information retrieval by using various recording media having different mark recording positions.

It is still another object of the present invention to provide an information retrieval apparatus capable of adjusting the mark detecting means to an optimal position in accordance with types of recording media.

In order to achieve the above objects of the present invention, there is provided an information retrieval apparatus including mark detecting means for detecting a mark formed on a recording medium in correspondence with each information, the mark detecting means being provided with a light source for illuminating the mark of the recording medium, and a light-receiving element for receiving light transmitted through the mark, wherein the light source of the mark detecting means comprises solid-state light-emitting means, the solid-state light-emitting means being provided with a single-wavelength light-emitting element for emitting visible light.

The solid-state light-emitting means preferably has an emission wavelength determined so that a light-shielding ratio of spectral transmission characteristics of the mark formed on the recording medium is a maximum.

The solid-state light-emitting means may comprise a solid-state light-emitting element, modulating means for PWM-modulating the solid-state light-emitting element, light-receiving means for receiving the PWM-modulated light from the light-emitting element, and demodulating means for demodulating an output signal from the light-receiving means.

The emission wavelength of the solid-state light-emitting element may be a wavelength determined so that a difference between the light-shielding ratio of the spectral characteristics of the mark on the information recording medium used and the transmission ratio (i.e., transmittance) of the spectral characteristics of the non-retrieved mark is a maximum.

The solid-state light-emitting element is suitably a semiconductor light-emitting element.

The semiconductor light-emitting element is preferably a visible-light LED or a visible-light semiconductor laser element.

Since a single-wavelength light-emitting element for emitting visible light is used, disturbing light as infrared rays or the like can be eliminated when light is transmitted through the mark, and the mark can be accurately detected. Therefore, a filter need not be used.

Since the solid-state light-emitting means is used in place of a light bulb having a filament, less heat is generated, and the response time of the light amount adjustment can be shortened. In addition, since the solid-state light-emitting means is used, deterioration over time is small, and the service life can be prolonged.

A low drive power is required, and the circuit arrangement of the apparatus can be simplified.

When the emission wavelength of the solid-state light-emitting means is set such that the light-shielding ratio of the spectral transmission characteristics of the mark is a maximum, mark detection can be more accurately performed.

If an arrangement for PWM-modulating an output from the light-emitting element and demodulating an output from the light-receiving means is employed, adverse influences such as noise can be reduced.

When the emission wavelength of the light-emitting means is set such that the difference between the transmission rate of spectral characteristics of the mark and that of non-mark area is a maximum, further accurate mark detection can be performed.

Furthermore, since the solid-state light-emitting means such as a semiconductor element is used as a light source, the apparatus can be made more compact.

According to the present invention, the second illuminating means for illuminating the mark is arranged independently of the first illuminating means for illuminating the information and mark on the information recording medium. There is also arranged means for setting the position of the mark detecting means on the basis of a designation by designating means which represents a relationship between the mark projected on the screen and the reference position.

With the above arrangement, the mark is projected on the screen, and the position of the mark detecting means is adjusted by a designation from the designating means for designating the relationship between the projected mark and the reference position. Therefore, the position of the mark detecting means can be easily adjusted for various information recording media having different mark recording positions, and accurate mark detection can be performed.

BRIEF DESCRIPTION OF THE DRAWINGS

FIGS. 9A and 9B show a fifth embodiment of the present invention, in which FIG. 9A is a view for explaining the fifth embodiment, and FIG. 9B is a sectional view showing a mounting state of the main part of a slide member;

FIGS. 15A–15F illustrate a control block diagram of a mark detector in an information retrieval apparatus according to a further embodiment of the present invention;

FIGS. 16A–16D illustrate a waveform chart showing control signals in the block diagram of FIGS. 15A–15F;

FIGS. 17B-1 and 17B-2 illustrate a waveform chart showing a relationship between the duty ratio and the peak light amount when a given power is applied;

FIGS. 18A-1, 18A-2, 18A-3 illustrate a waveform chart for explaining input and output waveforms of a sample & hold circuit;

FIGS. 18B-1 and 18B-2 illustrate a waveform chart of a single which passes through a filter;

DETAILED DESCRIPTION OF THE PREFERRED EMBODIMENTS

Figure 2:
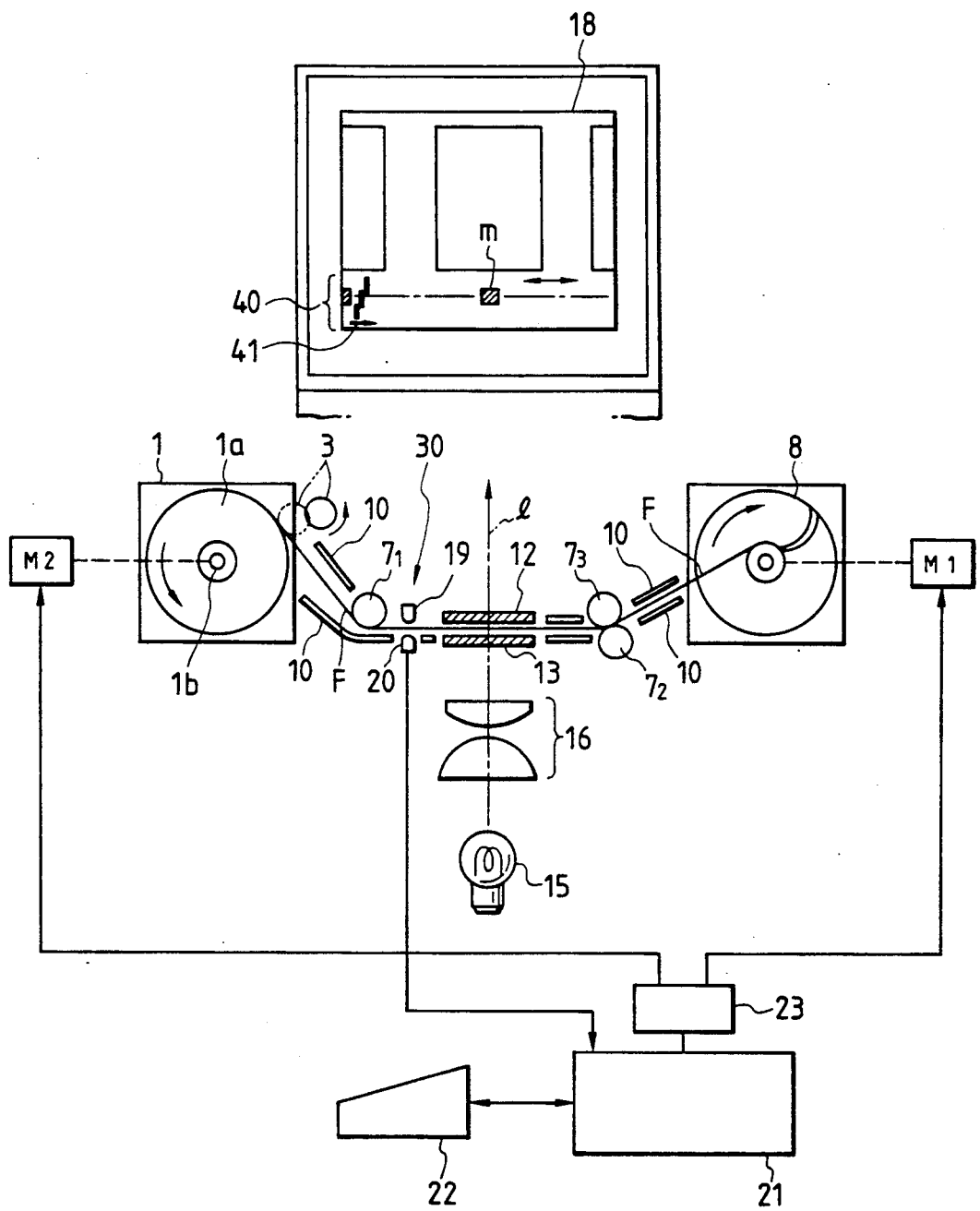
FIG. 2 is a view showing an arrangement of a microfilm reader which employs the present invention.
Figure 3:
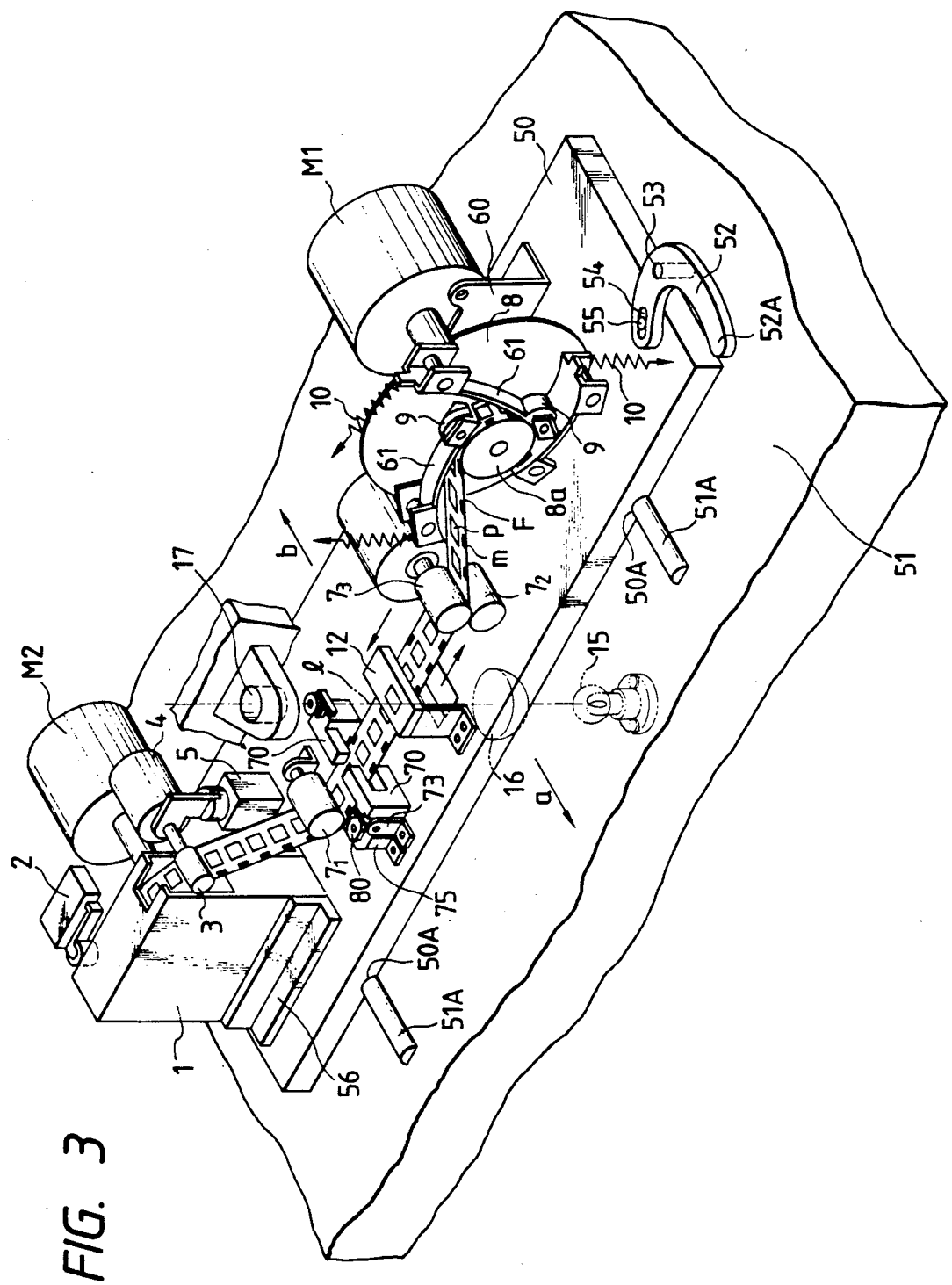
FIG. 3 is a schematic perspective view showing a microfilm feed unit in the microfilm reader shown in FIG. 2.

The present invention will be described in detail with reference to the accompanying drawings. FIGS. 2 and 3 show a microfilm feed unit in a microfilm reader with a retrieval apparatus which employs the present invention. Referring to FIGS. 2 and 3, a microfilm supply cartridge 1 detachably stores a roll of microfilm F as an information recording medium. A microswitch 2 detects that the cartridge 1 is loaded in a predetermined position of the microfilm reader. A loading roller 3 feeds out the microfilm F from the cartridge 1. A microfilm feedout motor 4 is driven to rotate the loading roller 3. A microfilm rewind motor M2 is driven to rotate a reel 1a and a reel hub 1b in the cartridge 1. A solenoid 5 is moved between a position where the loading roller 3 is in contact with the microfilm F and a position where the loading roller 3 is separated from the microfilm F.

The microfilm reader also includes microfilm guide rollers 7₁, 7₂, and 7₃, and a microfilm take-up reel 8. A guide roller 9 applies a pressure toward the center of a reel hub 8a of the take-up reel 8 to properly wind the leading end of the microfilm F around the shaft of the take-up reel.

A microfilm take-up motor M1 is driven to rotate the take-up reel 8. Guide plates 10 guide the microfilm along a predetermined microfilm feed path between the cartridge 1 and the take-up reel 8. Transparent glass plates 12 and 13 are parallel to each other, and the microfilm passes between the glass plates 12 and 13.

With the above arrangement, when the motor 4 is driven and the solenoid 5 is energized, the loading roller 3 is rotated and comes close to a position where it is brought into contact with the microfilm F in the cartridge 1. When the loading roller 3 is brought into contact with the microfilm F, the leading end of the microfilm F is fed from the cartridge 1. The microfilm F passes through a predetermined path and is fed toward the take-up reel 8. This feed direction is called a forward feed direction. When the leading end of the microfilm F passes by the guide roller 7₂, a microfilm detector (not shown) detects the microfilm F. A detection signal from the microfilm detector is supplied to drive the motor M1. Therefore, the take-up reel 8 is rotated.

When the leading end of the microfilm F reaches the take-up reel 8, the leading end of the microfilm F is automatically wound around the shaft of the take-up reel 8 by the guide roller 9. When the microfilm F is wound around the take-up reel 8, the motor 4 and the solenoid 5 are deenergized. The loading roller 3 is separated from the microfilm F and returns to the home position. When the leading end of the microfilm F is wound around the take-up reel 8, the microfilm F is fed from the cartridge 1 to the take-up reel 8 upon rotation of the take-up reel 8. In order to rewind the microfilm F into the cartridge 1, the motor M1 is stopped and the motor M2 is started. The reel 1a in the cartridge 1 is rotated in the rewinding direction, and the microfilm F is rewound into the cartridge 1. This rewinding direction is called a backward direction. Therefore, the motor M1 or M2 is driven to feed the microfilm F forward or backward.

A lamp 15 serves as a first illuminating means for illuminating an image frame P and a mark m formed at the side of the frame of the microfilm F. The microfilm reader further includes a condenser lens 16, and a projection lens 17 for enlarging and projecting an image of the microfilm F illuminated by the lamp 15 on the screen 18 or a photosensitive drum (not shown). An LED (light-emitting diode) 19 serves as a second illuminating means, arranged between the glass plate 12 and the guide roller 7₁, for illuminating the mark m. A photosensor 20 serves as a mark detecting means for detecting the mark m illuminated with the LED 19. The photosensor 20 and the LED 19 constitute a unit as a mark detector 30.

With the above arrangement, when the mark m on the microfilm F is illuminated with the LED 19 during feeding of the microfilm F, light is shielded by the mark m and a change in light amount is detected by the photosensor 20. An output signal from the photosensor 20 is counted by a counter in a controller 21. A count of the counter is compared by a comparator in the controller 21 with a frame number of a desired image frame input from a console 22 such as a keyboard. When the count coincides with the input frame number, a stop signal is supplied from the comparator to a motor drive control circuit 23 to stop the motor M1 or M2 which feeds the microfilm F. A desired frame is stopped at a predetermined position on the screen 18 through the projection lens 17.

The components of the above-mentioned microfilm feed unit are arranged on a carrier 50 shown in FIG. 3. The carrier 50 is supported to be movable in directions of arrows a and b with respect to a base 51 of the apparatus housing. A pair of semicylindrical rails 51A arranged on the base 51 are fitted in elongated grooves 50A formed in the bottom of the carrier 50, and the carrier 50 can be slid along the rails 51A.

An operation lever 52 is used to move the carrier 50 and is pivotally supported on a shaft 53 fixed on the base 51. A through hole 54 is formed at one end of the operation lever 52, and a pin 55 fixed on the carrier 50 is fitted in this hole 54.

When an operator holds an end portion 52A of the operation lever 52 and pivots the lever 52, the lever 52 is pivoted about the shaft 53. Upon pivotal movement of the lever 52, the carrier 50 can be moved in the directions of arrows a and b through the pin 55. Therefore, upon operation of the lever 52, the carrier 50 can be moved in the widthwise direction of the microfilm, so that the position of the side edge of the microfilm can be adjusted. The cartridge 1 is guided by a cartridge guide member 56 fixed on the carrier 50 and is held at a predetermined position of the carrier 50.

The take-up motor M1 and the take-up reel 8 are supported by a support member 60 fixed on the carrier 50. A roller 9 for assisting winding of the microfilm around the take-up reel 8 is held on an arm 61. The arm 61 is supported on the support member 60.

The rewind motor M2, the loading motor 4, the loading roller 3, the solenoid 5, the guide rollers $7_1$, $7_2$, and $7_3$, the guide plates 10, and the glass plates 12 and 13 are mounted on the carrier 50.

Figure 4:
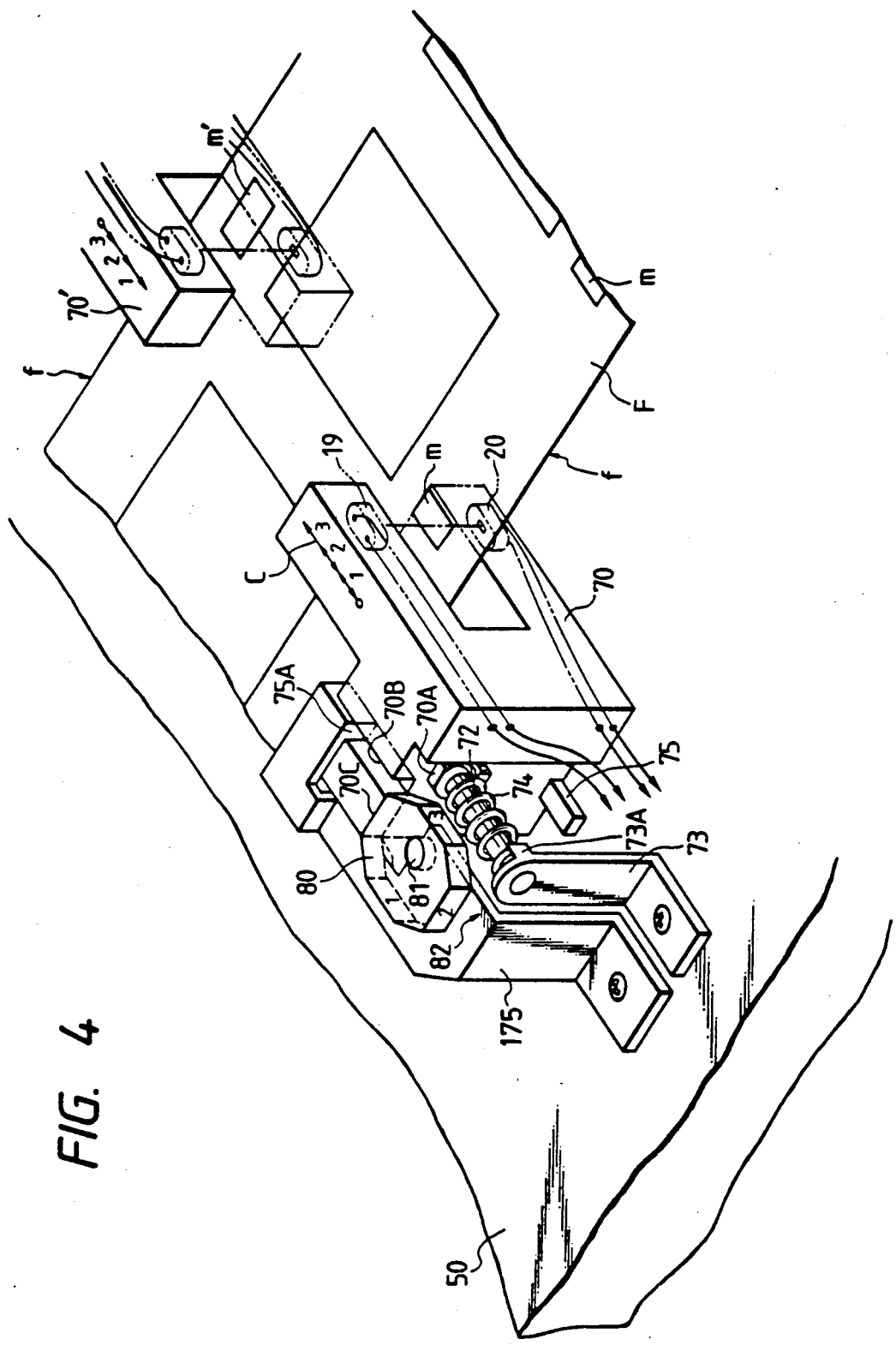
FIG. 4 is a perspective view showing the main part of a mechanism for moving a mark detector in the microfilm reader shown in FIG. 2.
Figure 5:
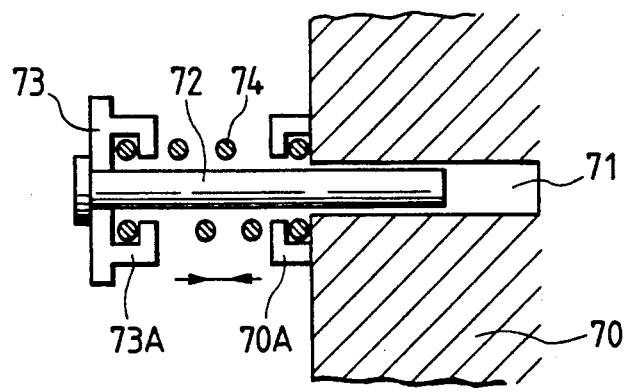
FIG. 5 is a sectional view showing the main part of the moving mechanism.

The mark detector 30 constituted by the LED 19 and the photosensor 20 is arranged to be movable in the widthwise direction of the microfilm, as shown in FIGS. 4 and 5. The LED 19 and the photosensor 20 are arranged on a movable support member 70 and oppose each other through a path along which the marks m of the microfilm F pass.

As shown in FIG. 5, a hole 71 is formed in the support member 70, and a support rod 72 is inserted in the hole 71. The support member 70 is movably supported by the support rod 72.

One end of the support rod 72 is fixed to L-shaped metal pieces 73 fixed on the carrier 50. A coil spring 74 is mounted on the support rod 72. One end of the coil spring 74 is fixed to pawls 73A of the metal pieces 73. The other end of the coil spring 74 is fixed to pawls 70A formed on the support member 70.

The coil spring 74 biases the support member 70 to move in a direction of the metal pieces 73. A guide member 75 is fitted in an elongated groove formed in the bottom portion of the support member 70. The bottom portion of the support member 70 is guided when the support member 70 is moved along the support rod 72.

An elongated groove 70B is formed on the upper surface of the support member 70 and is engaged with a guide portion 75A of an L-shaped metal piece 175 fixed on the carrier 50. The guide portion 75A guides the upper portion of the support member 70 when the support member 70 is moved along the support rod 72.

An operation knob 80 is used to position the mark detector 30 and comprises a polygonal eccentric cam. The operation knob 80 is supported to be pivotal about a shaft 81 fixed on the metal piece 175. Numbers "1", "2", and "3" are marked on three sides of the eccentric cam 80. One side of the eccentric cam 80 engages with a positioning end face 70C of the support member 70. The end face 70C of the support member 70 is always urged against the eccentric cam 80 by the coil spring 74. Numbers "1", "2", and "3" are marked on the upper surface of the support member 70 so as to correspond to the numbers marked on the eccentric cam 80. Upon pivotal movement of the eccentric cam 80, an arbitrary side of the cam can be engaged with the positioning end face 70C. That is, upon rotation of the eccentric cam 80, the support member 70 is moved in a direction indicated by arrow c.

When the side with number "1" of the eccentric cam 80 is located at a position of an index 82, the "1" position of arrow c of the mark detector 30 comes close to the reference position, i.e., toward the direction of a microfilm end f of the microfilm F. When the side with number "2" of the eccentric cam 80 is located at a position of the index 82, the "2" position of arrow c of the mark detector 30 is set at the reference position. When the side with number "3" of the eccentric cam 80 is located at the index 82, the "3" position of arrow c of the mark detector 30 is set at the reference position.

Referring to FIG. 3, the first illuminating means 15 is arranged on the base 51, while the condenser lens 16 and the projection lens 17 are arranged inside the housing of the apparatus.

Figure 1:
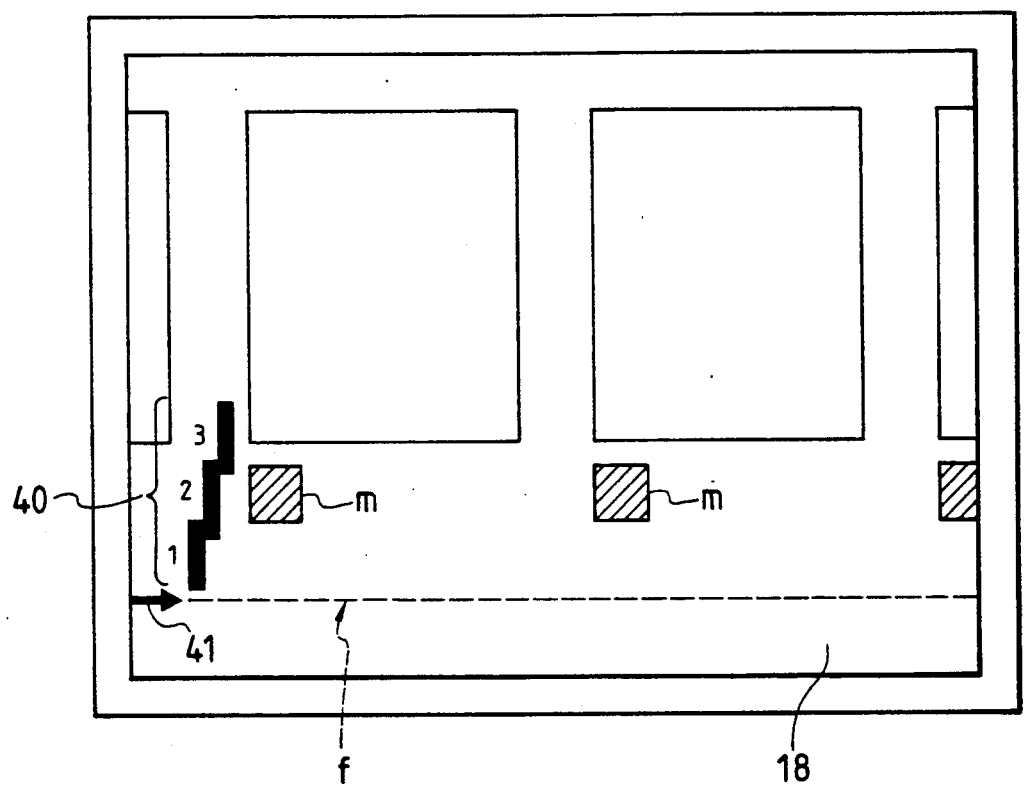
FIG. 1 is a front view showing a screen according to a first embodiment of the present invention.

FIG. 1 shows a first embodiment of the present invention. Referring to FIG. 1, a scale mark 40 serving as a designating means is formed on the screen 18. A microfilm end mark 41 represents the microfilm end f of the microfilm F. The numbers marked on the eccentric cam 80 and at arrow c of the support member 70 correspond to the "1", "2", and "3" positions of the scale mark 40 on the screen 18. The scale mark 40 designates an optimal position of the mark detector corresponding to the mark position in accordance with a relationship between the mark projected on the screen 18 and the scale mark.

An operation for aligning the position of the mark m recorded on the microfilm F with the position of the mark detector 30 will be described below. In a state wherein the microfilm F is kept wound around the take-up reel 8, the mark m is projected on the screen 18. The carrier 50 is moved in a direction of arrow a or b by the operation lever 52 shown in FIG. 3 and is set so that the microfilm end f (FIG. 1) projected on the screen 18 is located at the position of the microfilm end mark 41 formed on the screen 18, thus obtaining the state of FIG. 1. In this case, in the microfilm F shown in FIG. 1, the position of the mark m is read to be the "2" position of the scale mark 40. Thereafter, the eccentric cam 80 is rotated to align its side having the "2" position with the index 82. The mark detector 30 is thus set at the optimal position. That is, the line which connects the LED 19 and the photosensor 20 is aligned with the mark passing position.

If a scale mark for retrieval marks m' of the opposite side edge of the microfilm F is formed on the screen 18 in FIG. 1, the carrier 50 can be moved by the operation lever 52 to set a microfilm end f' at the position of a microfilm end mark 41' (FIG. 4) and to display it on the screen 18, thereby setting a mark detector 30' at an optimal position. Furthermore, since a single microfilm F is used, positional precision between an axis 1 of the projection system and the mark detector 30 falls within the range of about ±0.1 mm. A relative positional error between the mark m displayed on the screen 18 and the mark detector 30 rarely occurs.

According to this embodiment, the provision of the scale mark 40 on the screen 18 makes the mark detector 30 be able to be easily set at the optimal position.

Figure 6:
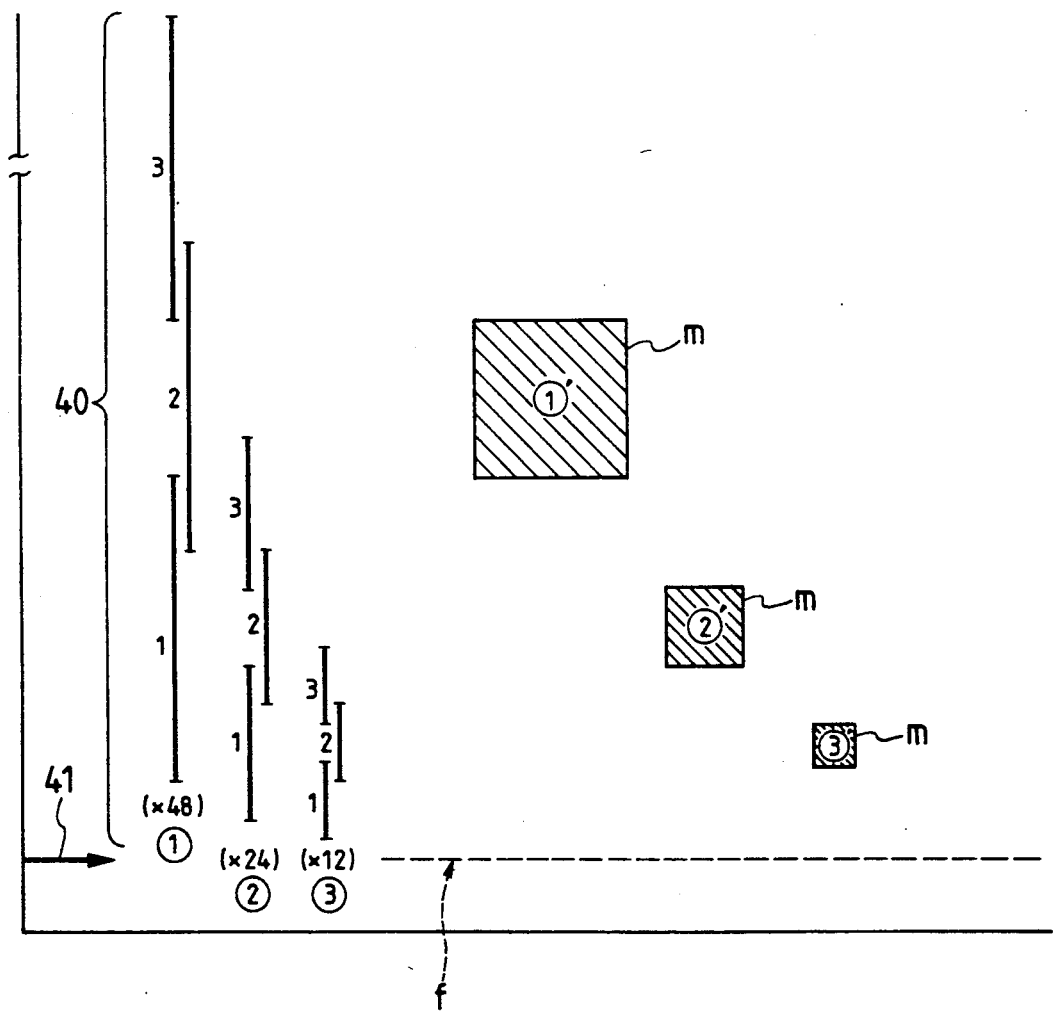
FIG. 6 is a view for explaining a second embodiment of the present invention.

FIG. 6 shows a second embodiment of the present invention. The same reference numerals as in the first embodiment denote the same parts in the second embodiment. In the first embodiment, only one projection magnification of the projection lens 17 is used. In the case of a microfilm, an operator may interchange the projection lens 17 with one having a desired magnification. In this second embodiment, even if the projection lens is interchanged with another projection lens having a different magnification from that of the currently attached projection lens, a scale mark can cope with a change in magnification. Referring to FIG. 6, a scale mark 40 represented by ① represents use of a 48 × (48 times) projection lens. The retrieval mark m is enlarged to correspond to the magnification (48 ×) of the lens, as indicated by ①'. A scale mark ② represents use of a 24 × projection lens; and ③, a 12 × projection lens. In these cases, retrieval marks m are enlarged and displayed to correspond to these magnifications, as indicated by ②' and ③', respectively. In this embodiment, since projection lenses having various magnifications can be used, versatility can be greatly improved. Other arrangements and functions are the same as those as in the first embodiment, and a detailed description thereof will be omitted.

Figure 7:
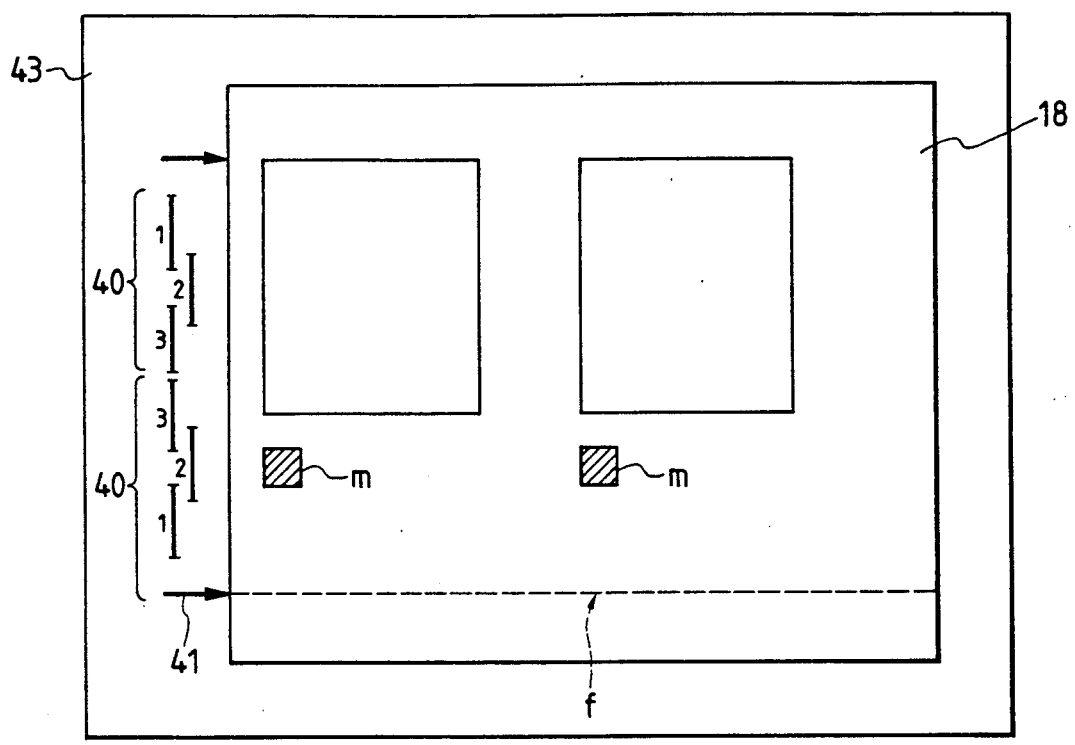
FIG. 7 is a front view showing a screen according to a third embodiment of the present invention.

FIG. 7 shows a third embodiment of the present invention. The same reference numerals as in the first embodiment denote the same parts in the third embodiment, and a detailed description thereof will be omitted. In the first and second embodiments, the scale mark or marks 40 are formed on the screen. When the scale mark 40 is formed on the screen 18, readability of the image is undesirably impaired. In the third embodiment, scale marks 40 are formed in a screen frame 43 formed around the screen 18, so that readability of the image on the screen can be improved. Other arrangements and effects are the same as those in the first embodiment, and a detailed description thereof will be omitted.

Figure 8:
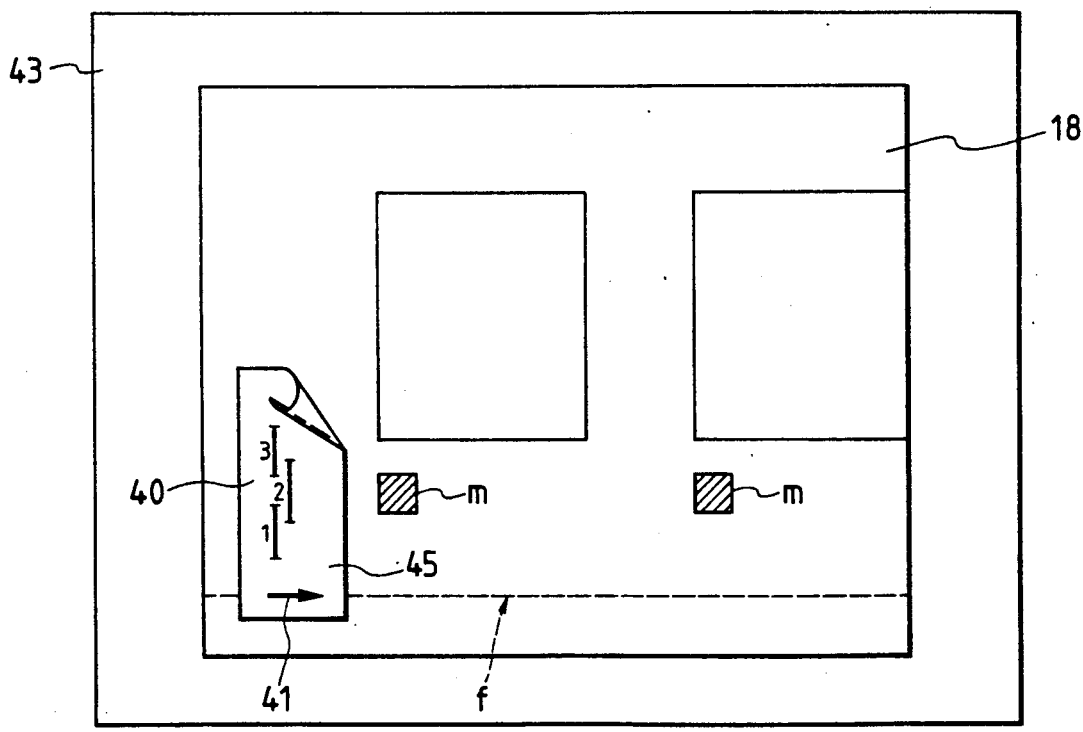
FIG. 8 is a front view showing a screen according to a fourth embodiment of the present invention.

FIG. 8 shows a fourth embodiment of the present invention. The same reference numerals as in the first embodiment denote the same parts in the fourth embodiment. In the fourth embodiment, a scale mark 40 formed on a transparent sheet 45 applied with an adhesive is formed on a screen. Since the user can peel the transparent sheet 45 from the screen 18, the scale mark can be changed in accordance with a magnification of a projection lens 17 used by the user. According to this embodiment, since a scale mark representing a magnification which is not used by the user is not adhered to the screen, the scale mark can be simplified. The user is not confused with selection of the scale marks, thereby improving operability. Other arrangements and effects are the same as those of the first embodiment, and a detailed description thereof will be omitted.

Figure 9A:
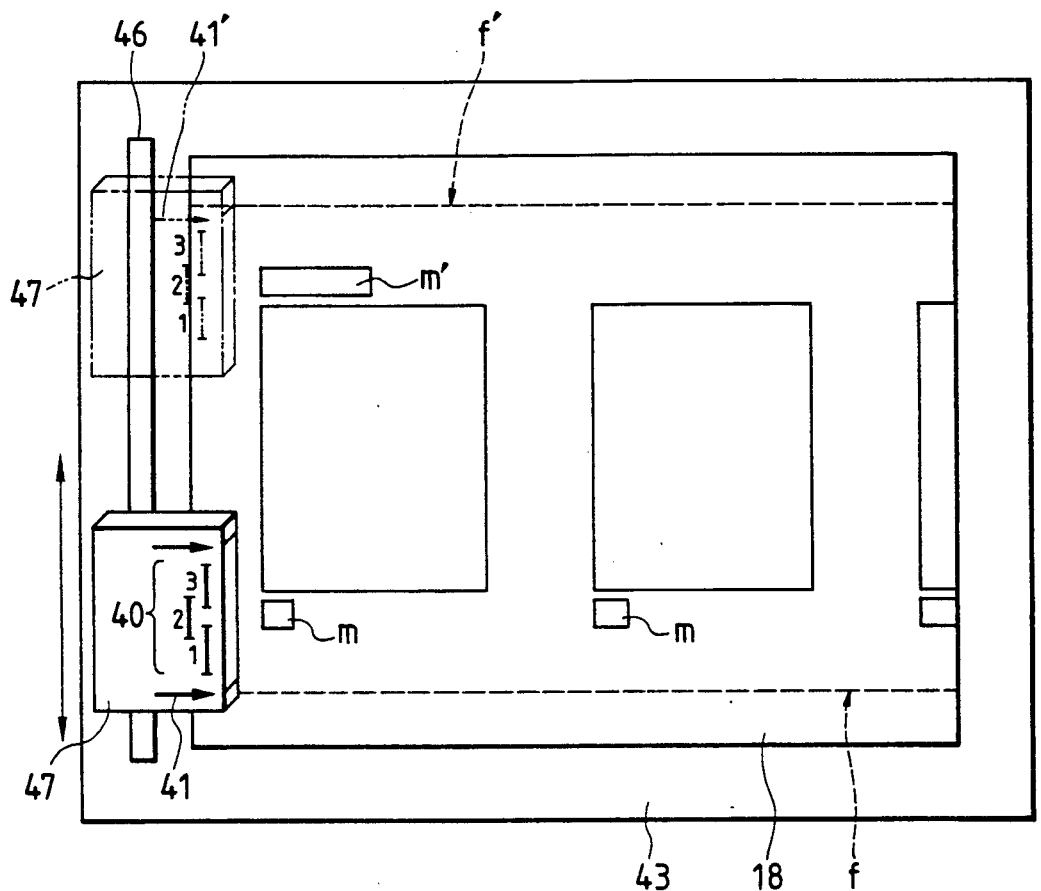
Figure 9B:
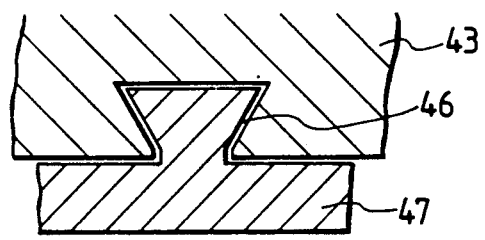
Figure 10A:
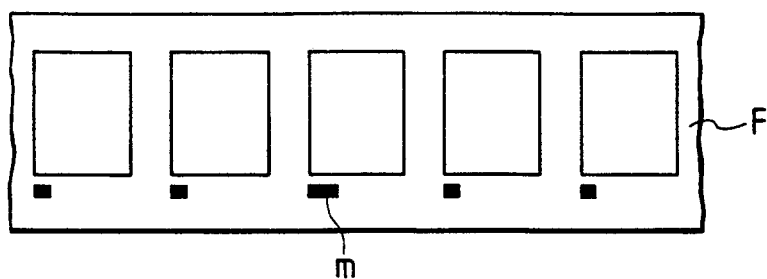
FIGS. 10A, 10B, 10C and 10D are respectively front views showing different specific forms of retrieval marks of the microfilm.
Figure 10B:
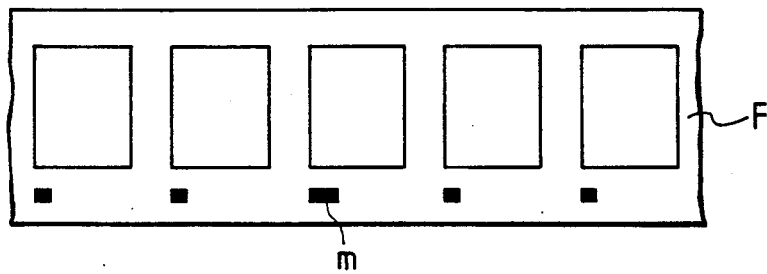
Figure 10C:
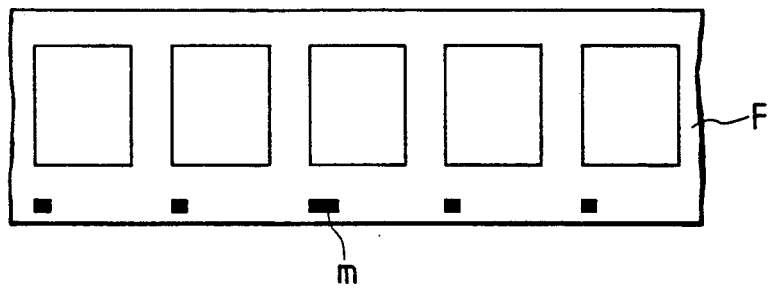
Figure 10D:
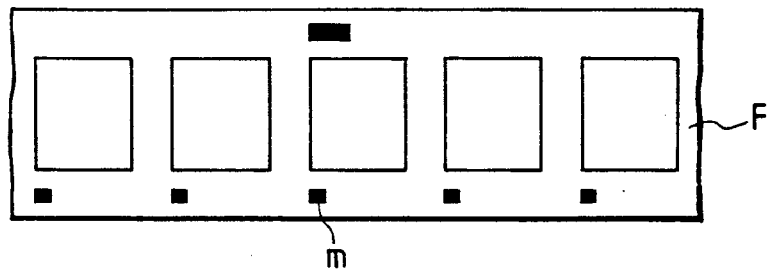

FIGS. 9A and 9B show a fifth embodiment of the present invention. The same reference numerals as in the first embodiment denote the same parts in the fifth embodiment. In the fifth embodiment, a scale mark serving as a designating means is arranged in a screen frame 43. More specifically, as shown in FIG. 9B, a slide member 47 is slidably fitted in a groove 46 formed in the screen frame 43. A scale mark 40 and a microfilm end mark 41 are formed on the front surface of the slide member 47. This embodiment is applied to an arrangement wherein the microfilm end f cannot be set at the microfilm end mark 41, that is, the carrier 50 cannot be largely moved, when the carrier 50 is moved by the operation lever 52. In this case, the designating means is arranged to be movable so that the microfilm end mark 41 can be set at the microfilm end f. The slide member 47 includes microfilm end marks 41 and 41' so that it is applicable to the microfilm end marks m and m'. When the microfilm ends f and f' are aligned with the microfilm end marks 41 and 41', the positions of the marks m and m' can be measured by the scale mark 40 formed on the slide member 47. Therefore, according to this embodiment, poor readability of the image on the screen 18 can be eliminated. This embodiment is also applicable to an arrangement having marks m and m' at both sides of the microfilm. Other arrangements and effects are the same as those in the first embodiment, and a detailed description thereof will be omitted.

In each embodiment described above, the present invention is applied to a microfilm in the form of a roll of microfilm. The present invention is not limited to the above embodiment and is applicable to a microfiche or a microfiche-like medium. In the above embodiments, the mark detector 30 can be moved in correspondence with "1", "2", and "3" positions of the scale mark. However, a large number of steps of the scale mark may be provided to continuously move the mark detector.

According to the present invention, the position of the photodetecting means can be easily adjusted for information recording media having different mark recording positions to detect the marks. The overall arrangement can be simplified, operability can be improved, and retrieval precision can also be improved.

Figure 11:
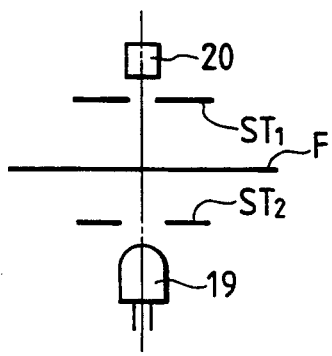
FIG. 11 is a schematic view showing a mark detector.
Figure 12:
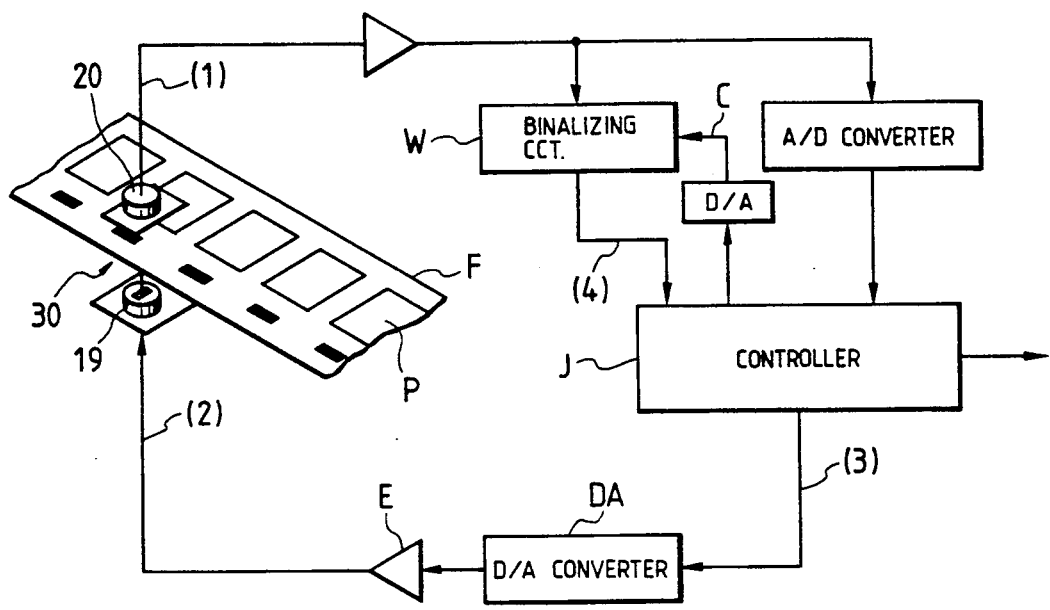
FIG. 12 is a control block diagram of the mark detector shown in FIG. 11.

FIGS. 11 and 12 show an arrangement of the mark detector 30. Retrieval marks m are formed on one side edge of the long microfilm F in correspondence with the respective frames P. The LED 19 and the photosensor 20 which serve as the second illuminating means read the marks m along the longitudinal direction of the microfilm.

The LED 19 is connected to a controller J through a D/A converter DA and an LED drive amplifier E. In order to emit light from the LED 19, an LED drive signal (3) is output from the controller J to optimally control an output (1) from the photosensor 20.

An operation will be described below. A feedback operation is performed such that an output from the photosensor 20 is controlled to be a predetermined value in the following manner. The output signal (1) from the photosensor 20 is detected, and the LED drive signal (3) is increased while the output from the photosensor 20 is not saturated. When the photosensor output signal (1) is given as a predetermined value which is not a saturation value, the LED drive signal (3) is fixed. As a result, the photosensor output signal (1) is given as an optimal value.

The microfilm F is loaded and set by the retrieval mechanism.

A normal retrieval operation is performed at an operation panel (not shown). When the mark m on the microfilm F crosses the photosensor 20, a light component is compared with a slice level signal C by a binarizing circuit W. The binarizing circuit W outputs a binary signal (4). When the controller J detects this binary signal (4), the corresponding image frame P on the microfilm F is retrieved.

Figure 14:
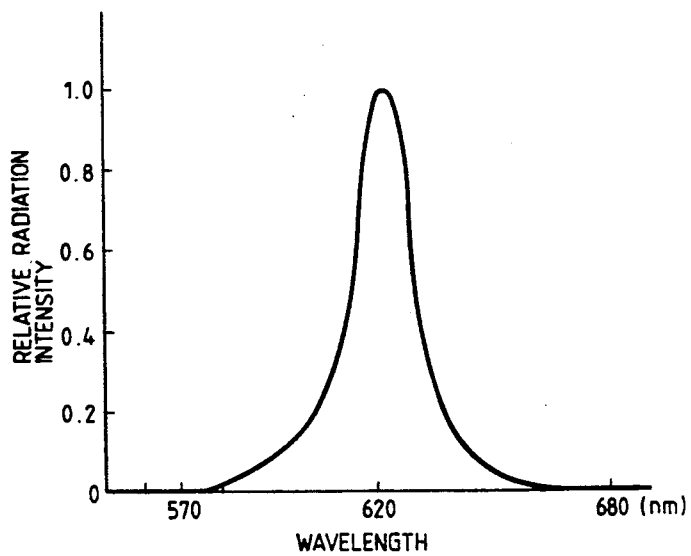
FIG. 14 is a graph showing spectrum distribution characteristics of an LED.

The LED 19 used as a light source of the mark detector 30 for performing the above operation generates monochromatic radiation having a visible-light wavelength. In this embodiment, the LED has a single spectrum distribution (peak: 620 nm) shown in FIG. 14. An optical filter (optical band-pass filter) used in a conventional arrangement need not be used.

The spectral transmission characteristics of the microfilm F will be described below. A sepia diazo microfilm has a transmittance or transmission rate of about 30% at about 700 nm in its characteristic curve. When the wavelength of the light source is increased, the transmittance is increased. Characteristic curves L2 and L3 show spectral transmission characteristics of blue diazo microfilms. Characteristic curves L1 and L2 are obtained when variations occur in developing conditions.

Figure 13:
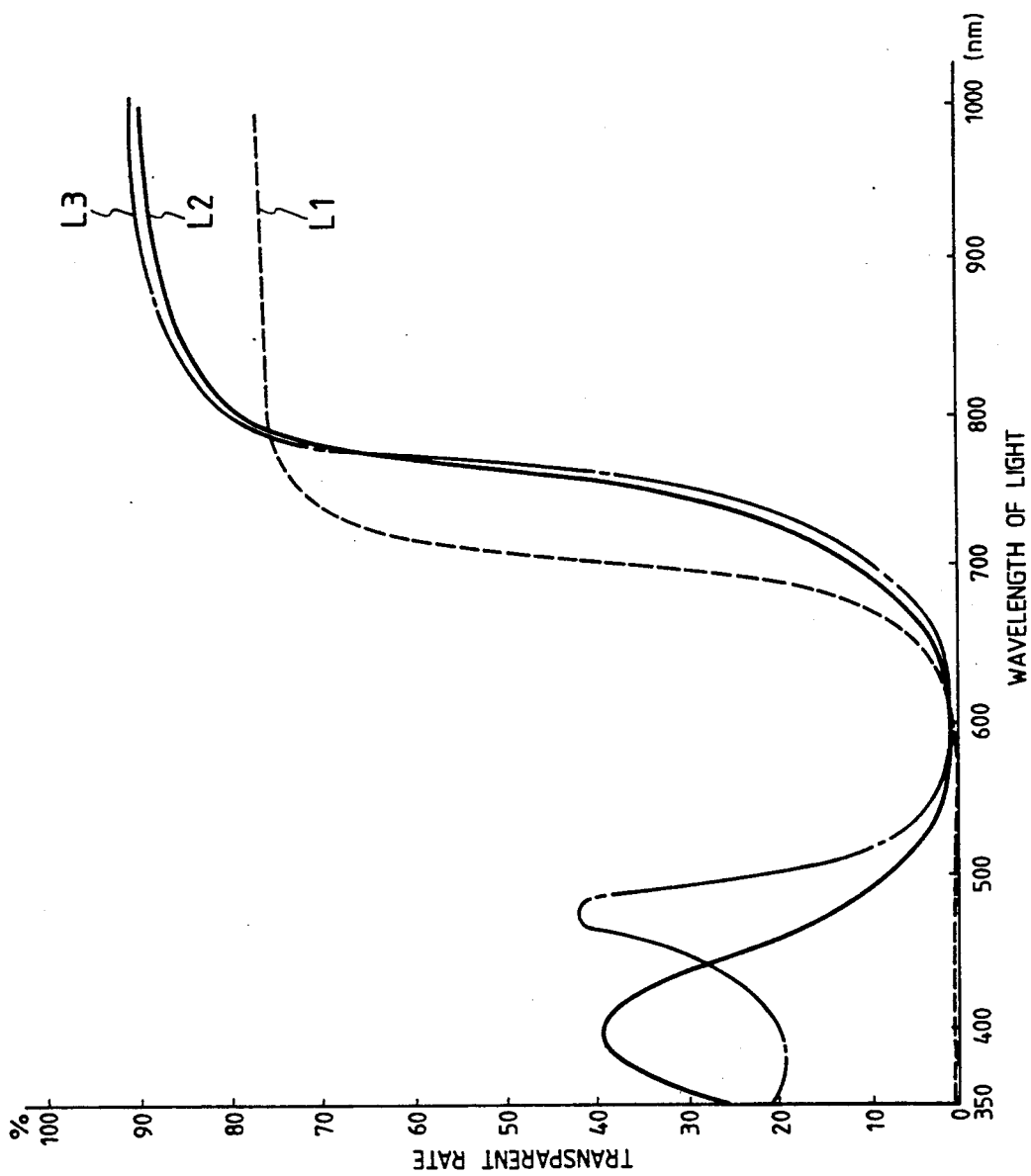
FIG. 13 is a graph showing spectral transmission characteristics of the mark of the microfilm.

The transmittances of the characteristic curves L1 and L2 are increased at about 500 to 400 nm. As can be apparent from FIG. 13, the contrast level is excessively decreased unless the wavelength of the light source for detecting the mark m falls within the range of about 550 to 680 nm. The wavelength which falls outside the above range is not suitable for detecting the mark m.

The LED having a monochromatic radiation wavelength falling within the range of about 520 to 680 nm is used as the second illuminating means. The mark can be accurately detected without using an optical filter as described above.

FIGS. 15A-15F and 16A-16D show a sixth embodiment of the present invention.

FIGS. 15A-15F is a control block diagram of the second embodiment, and FIGS. 16A-16D show waveforms at points in the block diagram. The same reference numerals as in the above embodiments denote the same parts in the sixth embodiment, and a detailed description thereof will be omitted.

Referring to FIGS. 15A-15F, a rectangular wave current (2) having a predetermined period is supplied to an LED 19 for illuminating a mark m formed on a microfilm F.

The waveform (2) can be obtained such that a predetermined analog value (analog light amount signal da) generated by a D/A converter DA is modulated by a modulation signal v by a modulating circuit V, and a modulated signal is amplified by an LED drive amplifier E. When this pulse signal (2) is applied to the LED 19, the LED 19 intermittently emits light as indicated by the waveform (2).

Light modulated as indicated by the waveform (2) passes through slits $ST_1$ and $ST_2$ and is received by a photosensor 20. When the mark m recorded on the microfilm F which is fed between the slits $ST_1$ and $ST_2$ passes immediately below the photosensor 20, light is partially shielded in accordance with a density of the mark m. Light transmitted through the mark m is received by the photosensor 20.

The received light is converted into an electrical signal by the photosensor 20. The electrical signal passes through a capacitor $C_1$, and only an AC component is amplified by an amplifier AMP. The amplified signal is transmitted to a waveshaping circuit Y.

The waveshaping circuit Y demodulates a chopped (modulated) signal to eliminate the AC component, as indicated b a signal (1). The circuit Y comprises a known sample & hold circuit which is synchronized with light modulation and a filter for eliminating noise and the like. The signal (1) is input to a binarizing circuit W and compared with a slice level SL. The signal (1) is converted into a binary signal (6) shown in FIG. 16 to detect a space signal SP and a mark signal m.

At this time, regarding SP representing the space and m representing the mark, the controller J counts pulses from a rotary encoder RE with a rubber roller rotted upon movement of the microfilm F so as to measure the length of mark m recorded on the microfilm (i.e., pulses in proportion to a feed amount of the microfilm F in number are output from the rotary encoder RE).

The rubber roller is mounted on a shaft of the rotary encoder RE. When the microfilm F is clamped between the rubber roller and a pinch roller and is fed in the forward or backward direction, forward/backward clock pulses are supplied to an up/down counter (not shown) to measure a length of the space SP or the mark m (e.g., Japanese Patent Application Laid-Open (Kokai) Nos. 58-43444 and 61-231666).

Figure 17A:
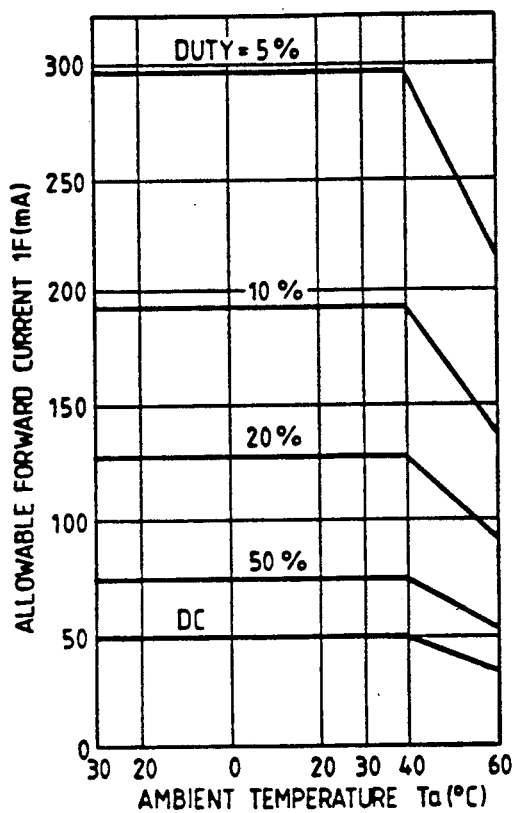
FIG. 17A is a graph showing the duty ratio of a pulse current applied to the LED as a function of the ambient temperature.
Figures 1, 17B:
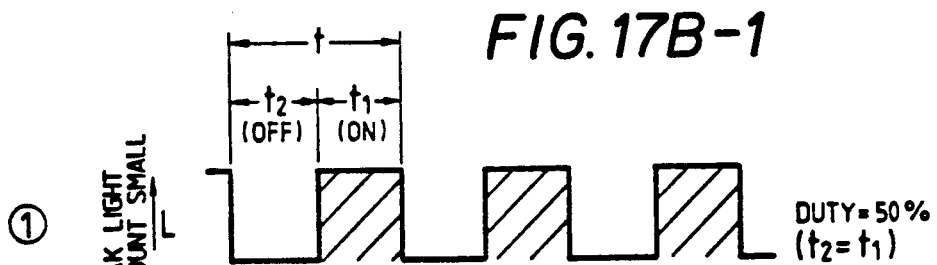
Figures 2, 17B:
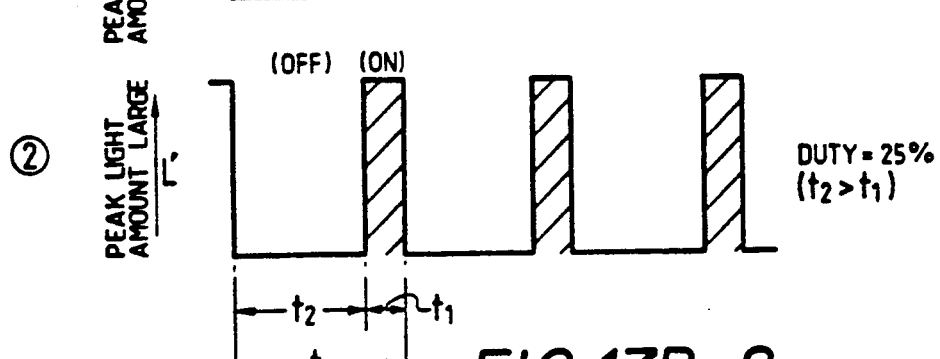

In the LED used as a light source, a duty ratio (t1 in the ON time and t2 in the OFF time) of the period t is changed to shorten the time t1 to increase a forward current, as shown in FIGS. 17A and 17B. This indicates that a decrease in the ON duty ratio causes an LED peak light amount to increase even if the power is kept unchanged. The gain of the amplifier on the side of the photosensor 20 (pulse height L' of the output from the photosensor 20) need not be increased. Therefore, an S/N ratio can be increased, and adverse influences such as noise can be suppressed.

A DC component of the output voltage from the photosensor 20 is cut by the capacitor $C_1$, and only the AC component can be amplified by the amplifier AMP. Therefore, temperature drift can be eliminated.

When the same peak light amount as in the DC ON operation is obtained and the duty ratio on the pulse ON state is decreased, power consumption of the LED can be reduced. In addition, heat generation of the LED can also be minimized. A servo technique of the peak light amount of the LED is shown in a flow chart of FIG. 19. An output from the photosensor 20 is fetched by a CPU in the controller J, and an LED current is increased/decreased to cope with extinction of light after long-term use of the LED and a decrease in output due to deterioration over time after long-term use.

Figure 20A:
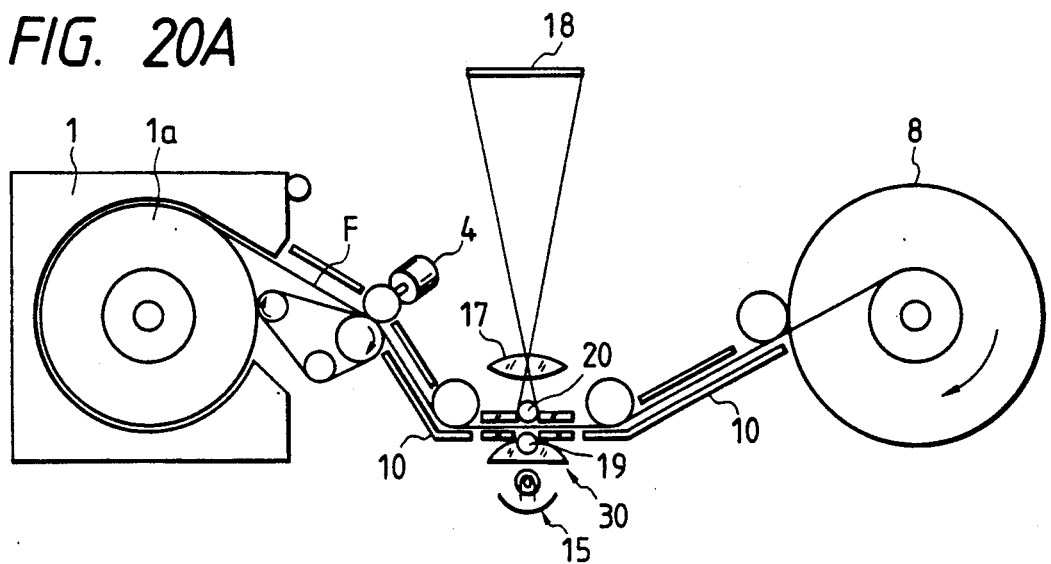
FIGS. 20A to 20C are views showing an information retrieval apparatus showing various specific modes of arrangements of the mark detector.
Figure 20B:
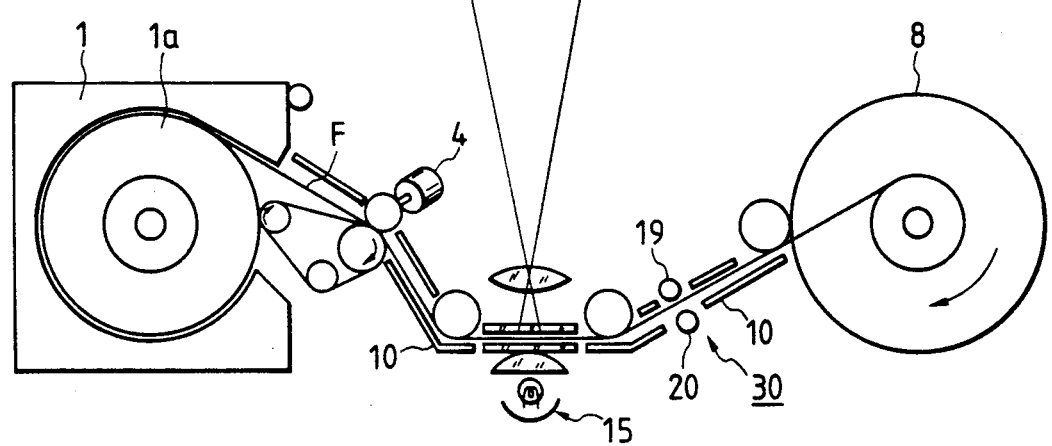
Figure 20C:
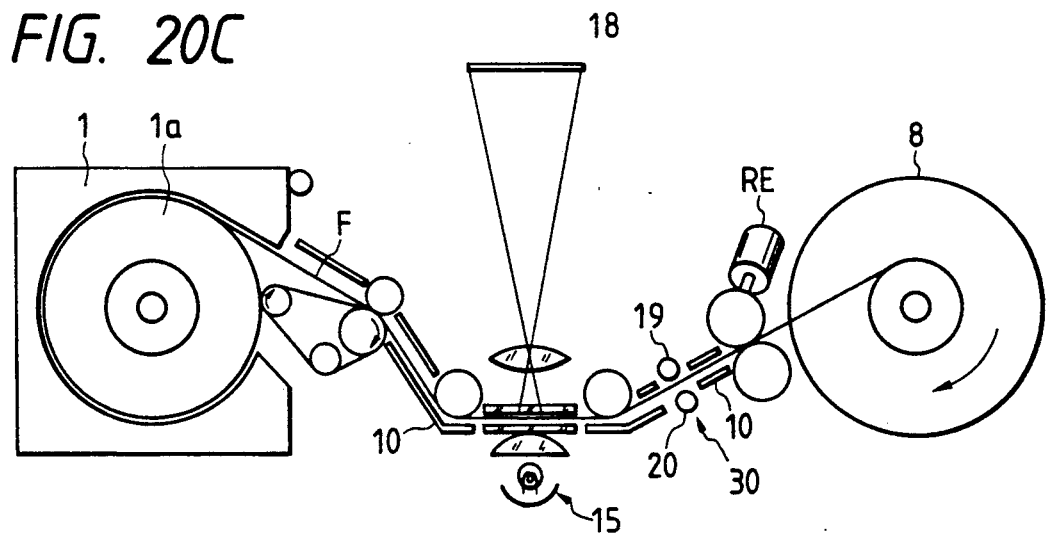

FIGS. 20A to 20C show various specific modes of positions of the mark detector 30.

The mark detector 30 is arranged on the film feed side with respect to the first illuminating means 15 in FIG. 2. However, the mark detector 30 may be arranged in the first illuminating means 15, as shown in FIG. 20A. Alternatively, the mark detector 30 may be arranged on the microfilm take-up side with respect to the first illuminating means, as shown in FIG. 20B.

FIG. 20C shows an arrangement wherein the mark detector 30 and the rotary encoder RE are arranged on the microfilm take-up side. This arrangement is different from that (FIG. 2) wherein the mark detector 30 is arranged on the microfilm feed side, and the rotary encoder RE is arranged on the microfilm take-up side.

The mark detector which employs the present invention can be arranged at any position in the microfilm travel system to obtain the same effects as in the above embodiments.

Figure 21:
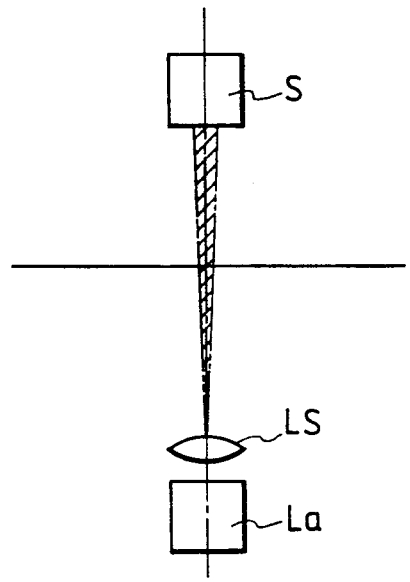
FIG. 21 is a schematic view showing a mark detector when a semiconductor laser is used as a light source.

FIG. 21 shows a seventh embodiment of the present invention. In this embodiment, a visible-light semiconductor laser La is used as a light source.

The semiconductor laser La is well known. Monochromatic radiation having a uniform phase can be obtained due to the characteristics of a laser beam. A laser beam can be easily produced by a simple lens LS. Therefore, the semiconductor laser La is used as a light source to obtain a thin laser beam without using the slits $ST_1$ and $ST_2$ shown in FIG. 11. Therefore, a narrow mark m on a microfilm F can be detected without using the slits $ST_1$ and $ST_2$.

The structure of a mark detector 30 can be extremely simplified. The laser beam from the semiconductor laser La is not a scattering beam and most of the beam can be incident on a photosensor S, thereby constituting a very effective light source.

Table 1 shows a relationship between materials of the semiconductor laser La and oscillation wavelengths. A desired oscillation wavelength can be selected in accordance with types of material and material component ratios.

TABLE 1

| Material | Forbidden Band Width (eV) | Oscillation Wavelength (μ) |
|---|---|---|
| $Zn_{0.4}CD_{0.6}Te$ | | 0.76 |
| $ZnSe_{0.36}Te_{0.64}$ | | 0.63 |
| | | 0.63 |
| $Cu_2Se-ZnSe$ | | 0.53 |
| | | 0.46 |
| $In_xGa_{(1-x)}As$ | 0.46–1.58 | 0.84–3.1 |
| ZnS | 3.9 | 0.33 |
| ZnO | 3.4 | 0.38 |
| CdS | 2.6 | 0.5 |
| $CdS_xSe_{(1-x)}$ | | 0.49–0.69 |
| GaSe | 2.3 | 0.59 |
| $GaA_xP_{(1-x)}$ | 1.58–2.2 | 0.65–0.84 |

Figure 22:
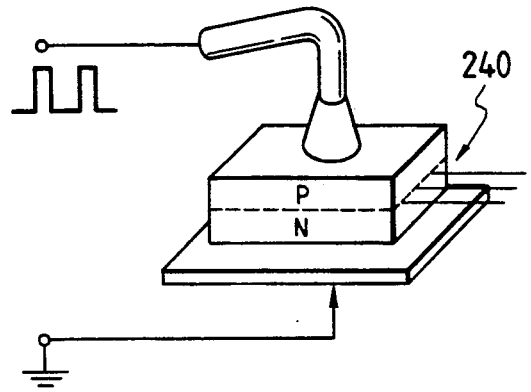
FIG. 22 is a schematic view showing the semiconductor laser.
Figure 24:
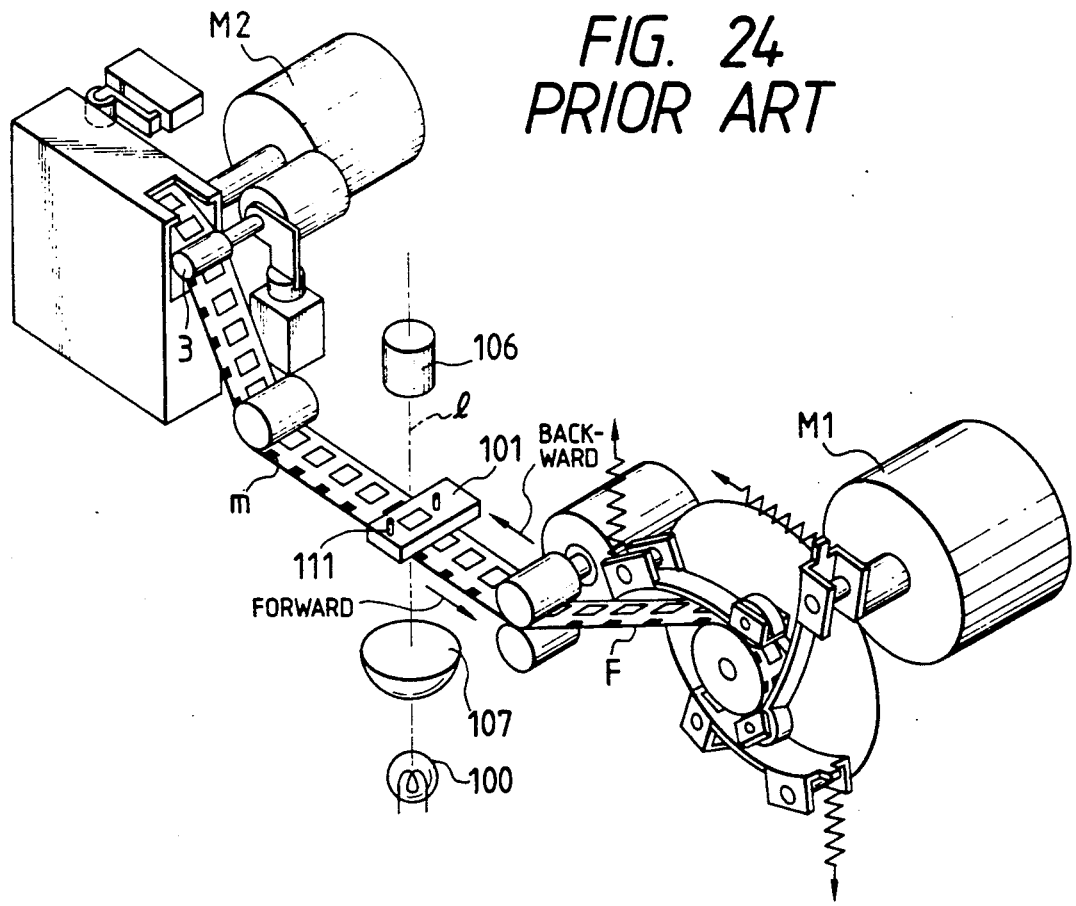
FIG. 24 is a schematic perspective view showing a microfilm feed unit in the apparatus shown in FIG. 23.
Figure 23:
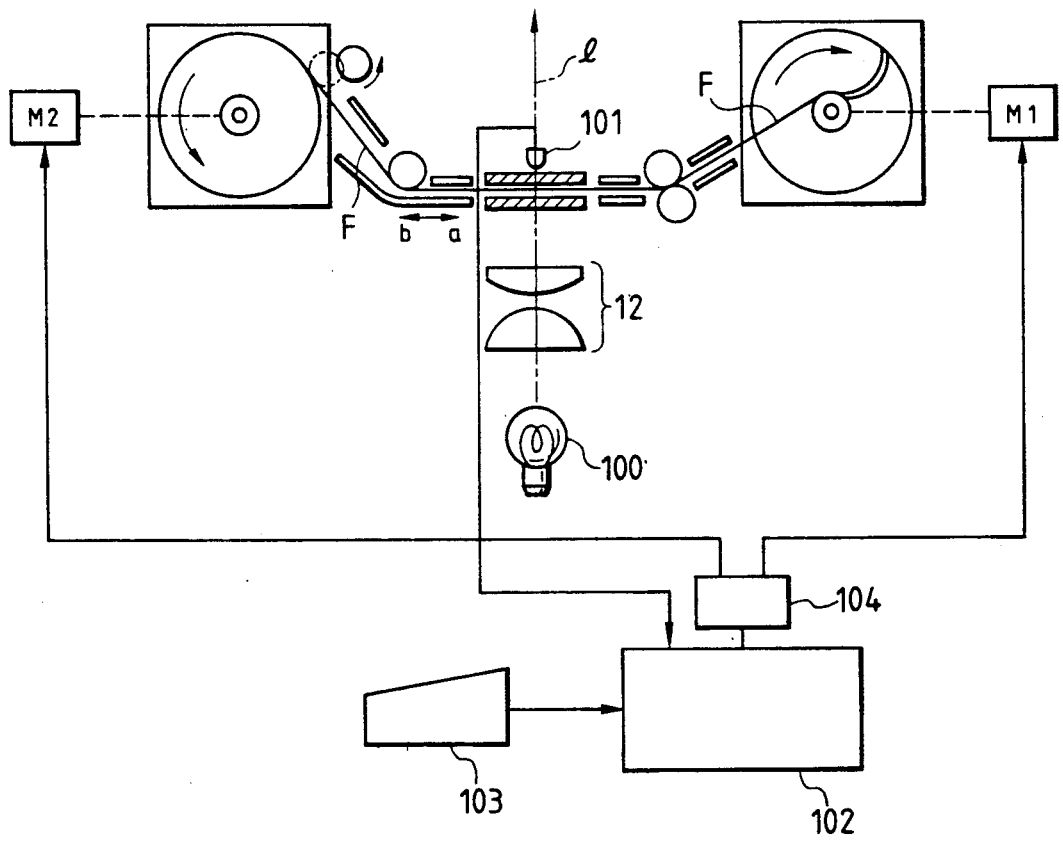
FIG. 23 is a schematic view showing a microfilm reader which employs a conventional retrieval apparatus.
Figure 25:
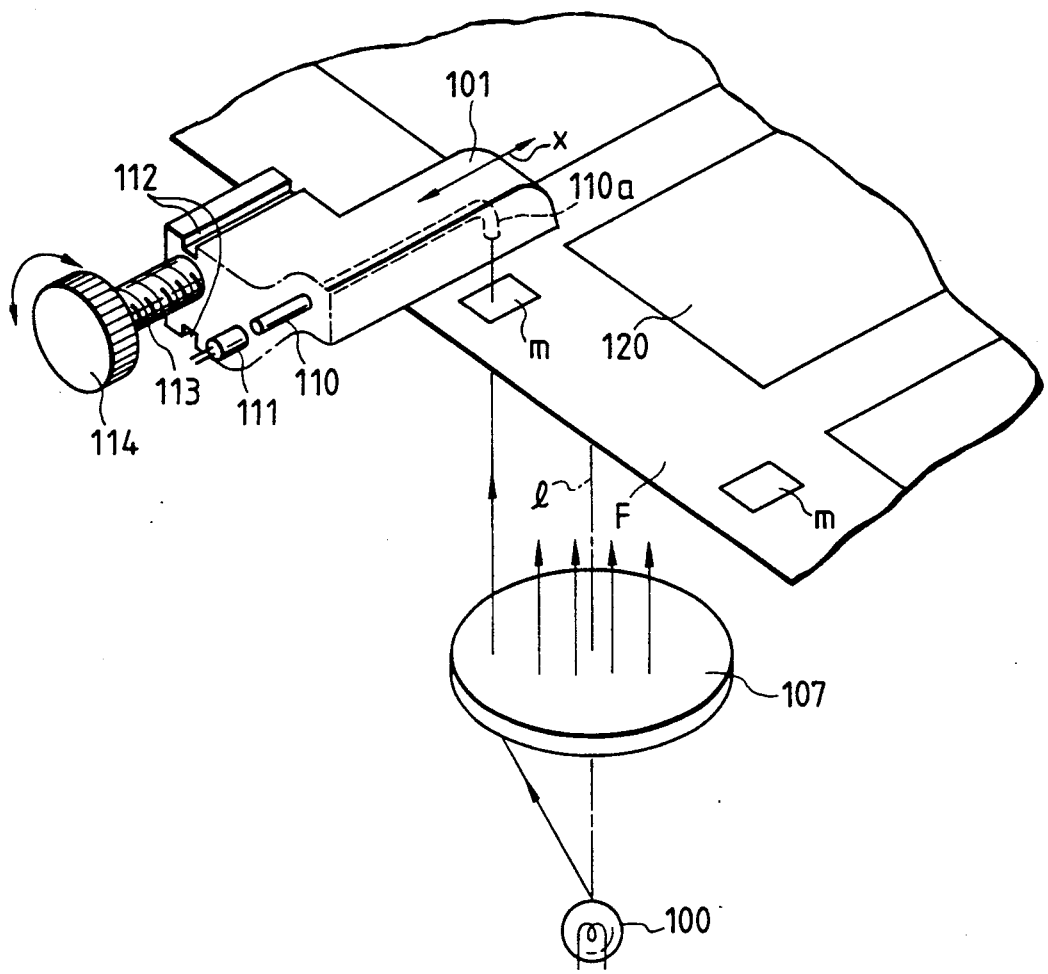
FIG. 25 is a perspective view showing the main part in a detection state of the mark detector in the conventional apparatus shown in FIG. 23.
Figure 26:
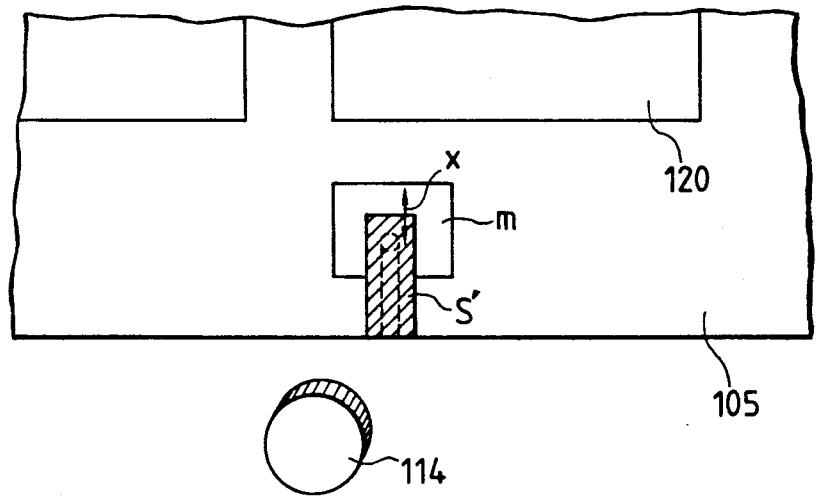
FIG. 26 is a view for explaining positional adjustment of the mark detector in the conventional apparatus shown in FIG. 23.

FIG. 22 shows a schematic structure of a semiconductor laser diode. A laser beam is emitted from a p-n junction 240 upon injection of a current pulse.

These semiconductor lasers are light-modulated as in the sixth embodiment, and a better effect can be obtained.

In each embodiment described above, an image frame of a roll of microfilm in the microfilm reader is retrieved. However, the present invention is also applicable to microfiche. The present invention is further applicable to apparatuses having detection mechanisms for detecting marks formed on transparent films.

A disturbing beam having a wavelength near those of the infrared rays can be eliminated, and mark detection can be accurately performed to improve reliability. In addition, since a filter need not be used, an operation for selecting a filter and the time required for selecting it can be omitted. In addition, a compact information retrieval apparatus can be provided.

A light bulb having a filament is not used, but a solid-state light-emitting means is used to minimize heat generated by this means. An operation error caused by heat can be prevented, and the response time for light amount adjustment can be shortened. Adjustment operations can be quickly performed. Furthermore, since the solid-state light-emitting means is used, deterioration over time of the light emitting characteristics of the light-emitting means can be minimized, and the service life of the apparatus can be prolonged. The light source, thus, need not be frequently replaced with a new one, thus offering better service.

The drive power is low, and heat dissipation of the light source need not be taken into consideration. Therefore, a compact arrangement can be achieved.

When an emission wavelength of the solid-state light-emitting means is set to maximize the light-shielding ratio of the spectral transmission characteristics of the mark, more accurate mark detection can be achieved.

When the light-emitting element is subjected to PWM modulation and an output from the photosensor is demodulated, adverse influences such as noise can be suppressed.

When the emission wavelength of the light-emitting element is set to maximize a difference between the transmittances of the mark and the nonmark area, more accurate mark detection can be performed.

Furthermore, the solid-state light-emitting means such as a semiconductor element is used as a light source, and therefore, the apparatus can be made more compact.

What is claimed is:

1. An information retrieval apparatus, comprising:
   first illuminating means for illuminating an image on microfilm;
   optical means for projecting the image illuminated by said first illuminating means;
   second illuminating means for illuminating a mark of the microfilm which is not being illuminated by said first illuminating means, said second illuminating means including a solid-state light-emitting element generating monochromatic light only within a wavelength region between 520 and 680 nm; and
   means for detecting the mark by detecting light transmitted through the mark illuminated by said second illuminating means.

2. An apparatus according to claim 1, wherein said light-emitting element comprises an LED.

3. An apparatus according to claim 1, wherein said light-emitting element comprises a laser generating element.

4. An apparatus according to claim 1, wherein said second illuminating means includes modulating means for intermittently applying a pulse signal to said light-emitting element, and said detecting means includes a photosensor for receiving light emitted from said light-emitting element and means for converting an output signal from said photosensor into a binary signal.

5. An apparatus according to claim 1, wherein said light-emitting element generates light having a wavelength range which maximizes a difference between transmittances of the mark and a nonmark portion on the information recording medium used.

6. An apparatus according to claim 1, wherein spectrum of a maximum luminescence of said solid-state light-emitting element is 620 nm.

7. An information retrieval apparatus, comprising:
   first illuminating means for illuminating an image on an information recording medium;
   optical means for projecting the image illuminated by said first illuminating means on a screen and for varying the magnification of the projected image;
   second illuminating means for illuminating a mark on the information recording medium;
   means for detecting the mark illuminated by said second illuminating means;
   means for feeding the information recording medium along a predetermined path;

means for controlling said feeding means on the basis of an output signal from said detecting means;

means for designating an optimal position of said detecting means which corresponds to a position of the mark projected on said screen, said designating means having an index mark indicative of the optimal position corresponding to the projection magnification; and means for setting the position of said detecting means on the basis of the designation by said designating means.

8. An apparatus according to claim 7, wherein said second illuminating means includes a solid-state light-emitting element.

9. An information retrieval apparatus, comprising:

first illuminating means for illuminating an image on an information recording medium;

optical means for projecting the image illuminated by said first illuminating means on a screen and for varying the magnification of the projected image;

second illuminating means for illuminating a mark on the information recording medium;

means for detecting the mark illuminated by said second illuminating means;

means for feeding the information recording medium along a predetermined path;

means for controlling said feeding means on the basis of an output signal from said detecting means;

means for designating an optimal position of said detecting means which corresponds to a position of the mark projected on said screen, said designating means having an index mark indicative of the optimal position corresponding to the projection magnification and formed at a position located substantially on said screen;

means for setting the position of said detecting means on the basis of the designation by said designating means.

10. An apparatus according to claim 9, wherein said setting means includes supporting means for movably supporting said detecting means and operating means for moving said supporting means.

11. An apparatus according to claim 9, wherein said second illuminating means illuminates a mark of the information recording medium which is not projected on said screen.

12. A film projection apparatus for projecting an image on a film, said apparatus comprising:

first illuminating means for illuminating the image on the film;

optical means for projecting the image illuminated by said first illuminating means onto a screen;

second illuminating means for illuminating a mark on the film which is not being illuminated by said first illuminating means, with the mark being located at a side of the image, said second illuminating means including a solid-state light-emitting element generating monochromatic light only within a wavelength region between 520 and 680 nm;

a feeding unit for supplying the film;

a take-up unit for taking up the film from said feeding unit;

feeding means for feeding the film from said feeding unit to said take-up unit through said first and second illuminating means; and detection means for detecting the mark by detecting lgiht from the mark illuminated by said second illuminating means.

13. An apparatus according to claim 12, wherein said second illuminating means includes means for applying a pulse signal having a predetermined period to said solid-state light-emitting element so as to cause said solid-state light-emitting element to intermittently emit lgiht.

14. An apparatus according to claim 12, wherein said solid-state light-emitting element comprises a semiconductor element.

15. An apparatus according to claim 12, wherein said second illuminating means is located between said feeding unit and said first illuminating means.

16. An apparatus according to claim 12, wherein said light-emitting element is an LED.

17. An apparatus according to claim 12, wherein said detection means includes a photosensor, and further comprising means for controlling a light emission amount of said light-emitting element on the basis of output from said photosensor.

18. A microfilm reader, comprising:

a first light source for illuminating an image on microfilm located at a first illumination position;

a screen onto which the image on the microfilm is projected;

projecting means for projecting the image on the microfilm located at the first illumination position onto said screen;

a second light source for illuminating a mark on the microfilm located at a second illumination position different from the first illumination position with respect to a microfilm feed direction, said second light source including a light-emitting element generating monochromatic light only within a wavelength region between 520 and 680 nm;

a feed reel for supplying the microfilm;

a take-up reel for taking up the microfilm supplied from said feed reel;

feeding means for feeding the microfilm wound on said feed reel along a feed path to said take-up reel through the first and second illuminating positions; and a photosensor located opposite said second light source with respect to the feed path of the microfilm to detect the mark on the microfilm illuminated by said second light source.

19. A microfilm reader, comprising:

a first light source located at one side of a microfilm feed path to illuminate an image on the microfilm;

a screen onto which the image on the microfilm is projected;

projecting means for projecting the image on the microfilm being illuminated by said first light source onto said screen;

a second light source located at the other side of the feed path to illuminate a mark on the microfilm, said second light source generating monochromatic light within a specific wavelength region; and detection means, located at the same side of the feed path as said first light source, for detecting the mark on the microfilm illuminated by said second light source.

* * * * *

UNITED STATES PATENT AND TRADEMARK OFFICE
CERTIFICATE OF CORRECTION

PATENT NO. : 5,137,347

DATED : August 11, 1992

INVENTOR(S) : Ryoichi Imai

It is certified that error appears in the above-identified patent and that said Letters Patent is hereby corrected as shown below:

Drawings:

SHEET 11:

FIG. 15A, "BINALIZING" should read --BINARIZING--.

SHEET 12:

FIGS. 16C and 16D, "BINALIZING" (both occurrences) should read --BINARIZING--.

Figure 19:
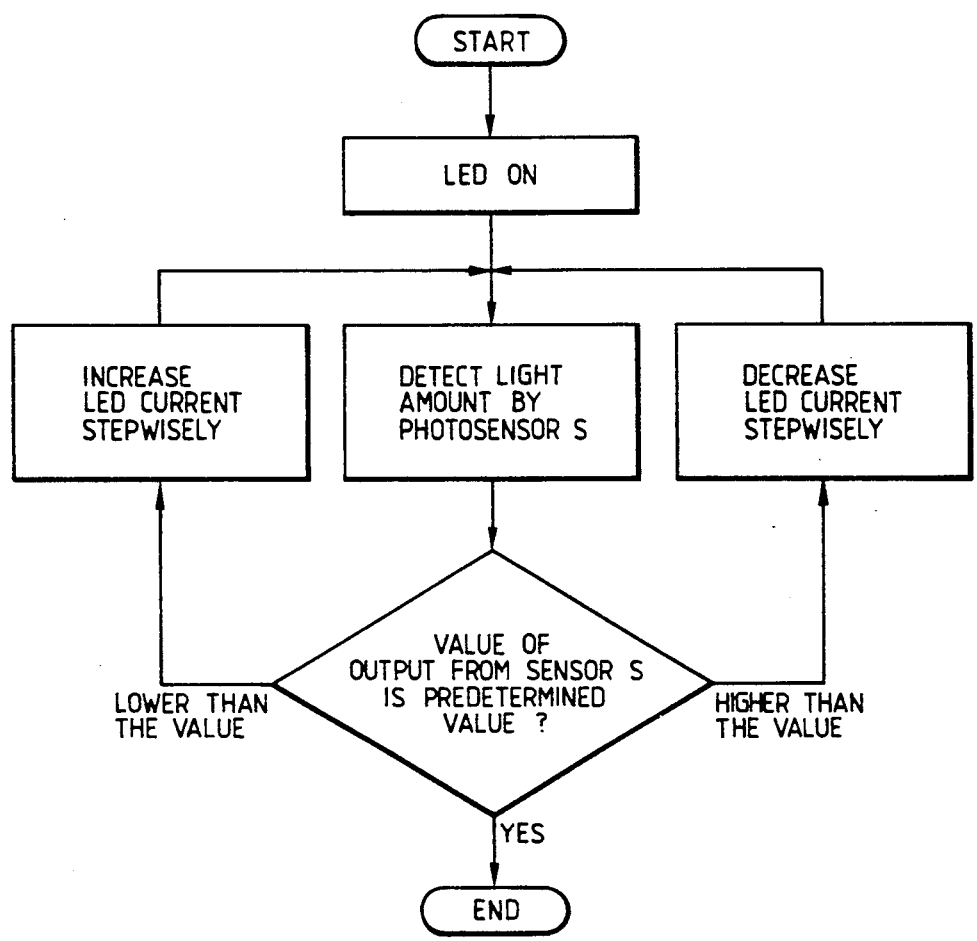
FIG. 19 is a flow chart for explaining a servo operation of an LED light amount so as to set a photosensor output to be a predetermined value.

SHEET 15:

FIG. 19, "STEPWISELY" should read --STEPWISE--.

COLUMN 2:

Line 12, "case.  The" should read --case, the--.

COLUMN 5:

Line 24, "single" should read --signal--.

COLUMN 9:

Line 67, "FIG. 98," should read --FIG. 9B,--.

UNITED STATES PATENT AND TRADEMARK OFFICE
CERTIFICATE OF CORRECTION

PATENT NO. : 5,137,347
DATED : August 11, 1992
INVENTOR(S) : Ryoichi Imai

Page 2 of 2

It is certified that error appears in the above-identified patent and that said Letters Patent is hereby corrected as shown below:

COLUMN 11:

Line 67, "b" should read --by--.

COLUMN 12:

Line 8, "rotted" should read --rotated--.

COLUMN 14:

Line 53, "spec-" should read --the spec- --.

COLUMN 16:

Line 2, "lgiht" should read --light--.
Line 9, "lgiht." should read --light.--.
Line 37, "region" should read --range--.
Line 43, "illuminating" should read --illumination--.

Signed and Sealed this

Eleventh Day of January, 1994

Attest:

BRUCE LEHMAN

Attesting Officer    Commissioner of Patents and Trademarks